(12) United States Patent
Ikeuchi et al.

(10) Patent No.: US 7,159,071 B2
(45) Date of Patent: Jan. 2, 2007

(54) STORAGE SYSTEM AND DISK LOAD BALANCE CONTROL METHOD THEREOF

(75) Inventors: Kazuhiko Ikeuchi, Kawasaki (JP); Mikio Ito, Kawasaki (JP); Hidejirou Daikokuya, Kawasaki (JP); Kazuma Takatsu, Kawasaki (JP); Katsuhiko Nagashima, Kawasaki (JP); Koji Uchida, Kawasaki (JP); Akihito Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 10/788,218

(22) Filed: Feb. 26, 2004

(65) Prior Publication Data

US 2004/0230742 A1 Nov. 18, 2004

(30) Foreign Application Priority Data

Mar. 7, 2003 (JP) ............................ 2003-061517
Aug. 18, 2003 (JP) ............................ 2003-294058

(51) Int. Cl.
*G06F 12/00* (2006.01)

(52) U.S. Cl. .................. 711/112; 711/158; 711/163

(58) Field of Classification Search .................. None
See application file for complete search history.

(56) References Cited

U.S. PATENT DOCUMENTS 6,073,218 A * 6/2000 DeKoning et al. .......... 711/150

6,591,339 B1 * 7/2003 Horst et al. ................. 711/114
6,606,698 B1 * 8/2003 Fradette ..................... 711/209
2004/0133707 A1 * 7/2004 Yoshiya et al. ............. 710/6

FOREIGN PATENT DOCUMENTS

| JP | 5-233388 | 9/1993 |
| JP | 8-063298 | 3/1996 |
| JP | 2001-344073 | 12/2001 |
| JP | 2002-023962 | 1/2002 |

OTHER PUBLICATIONS

Microsoft Computer Dictionary, 5th edition, © 2002, Microsoft Press, p. 472.*

* cited by examiner

*Primary Examiner*—Reginald Bragdon
*Assistant Examiner*—Horace L. Flournoy
(74) *Attorney, Agent, or Firm*—Greer, Burns & Crain, Ltd.

(57) ABSTRACT

A storage system prevents a time out error of the host I/O caused by a stagnation of command processing in the storage system for accessing a disk device according to the host I/O request and internal I/O request. In DTC, counters for managing the requests in-process for host I/Os (host read) and internal I/Os (pre-fetch, write back) individually are provided, and the number of processing requests to be issued to a virtual disk (RLU) is limited individually. By assigning priority to the host I/Os, the load balance of the host I/Os and internal I/Os can be controlled. For rebuild/copy back, a dedicated load control mechanism is disposed where the load adjustment between ordinary I/Os and rebuild/copy back is performed.

26 Claims, 20 Drawing Sheets

FIG. 3
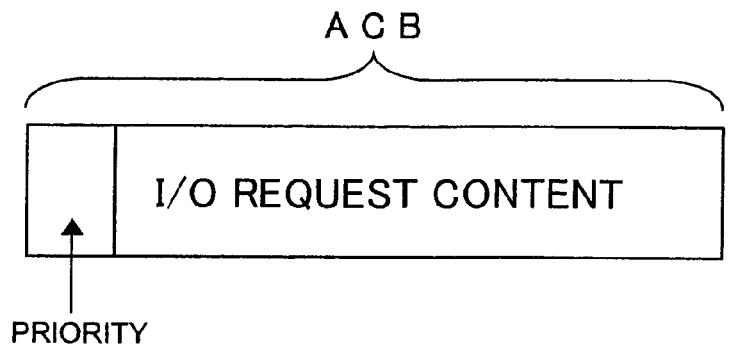
FIG. 4
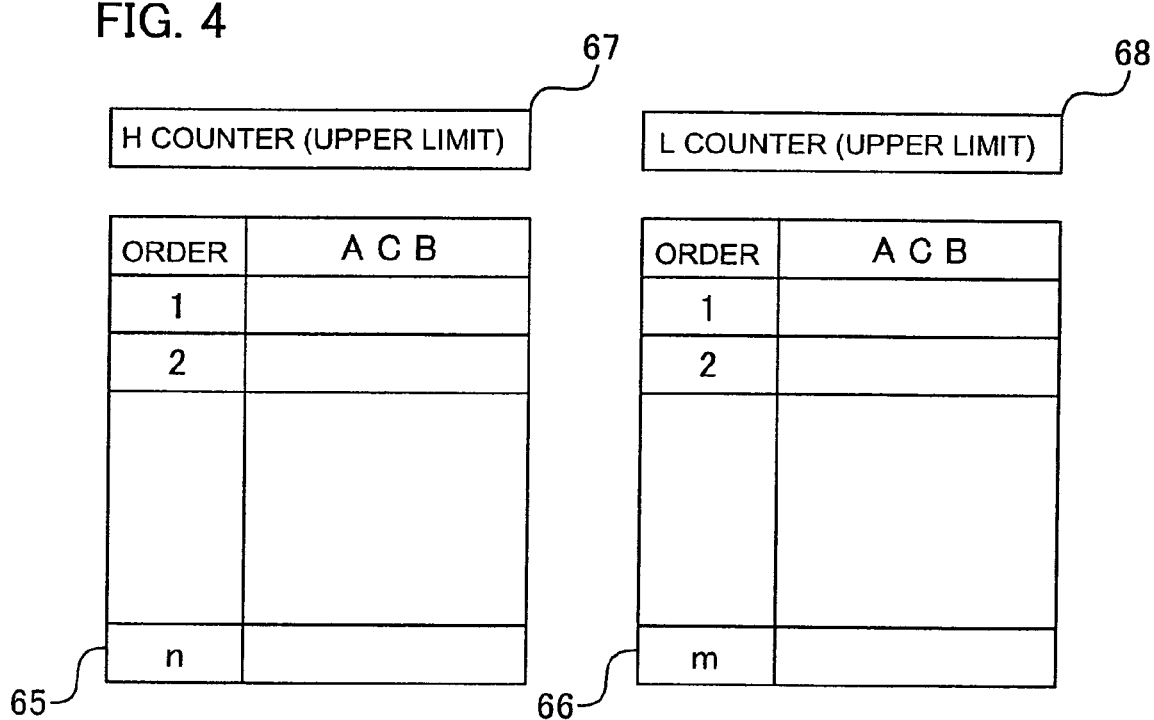
FIG. 5
| HOST | BACK END PROCESS SYCHRONIZING WITH HOST I/O (Read , Write Through) |
|---|---|
| Internal | BACK END PROCESS OF INTERNAL SCHEDULE (Prefetch , Writeback) |

STORAGE SYSTEM AND DISK LOAD BALANCE CONTROL METHOD THEREOF

CROSS-REFERENCE TO RELATED APPLICATIONS

This application is based upon and claims the benefit of priority from the prior Japanese Patent Application No. 2003-061517, filed on Mar. 7, 2003 and the prior Japanese Patent Application No. 2003-294058, filed on Aug. 18, 2003, the entire contents of which are incorporated herein by reference.

BACKGROUND OF THE INVENTION

1. Field of the Invention

The present invention relates to a storage system which inputs/outputs data using such storage devices as a magnetic disk, and the disk load balance control method thereof, and more particularly to a storage system which performs balance processing for the host I/O commands and internal I/O commands so as to prevent the stagnation of command processing, and disk load balance control method thereof.

2. Description of the Related Art

In storage devices using such storage medium as a magnetic disk, magneto-optical disk and optical disk, the storage medium is actually accessed by a request of the data processor. If the data processor uses large capacity data, a storage system comprised of a plurality of storage units and a control device is used.

Such a storage system has a DTC (Dynamic Traffic Control) function for optimizing resource allocation dynamically within the system when a large volume of data is accessed, and implementing stable performance for access from a host device. FIG. 24 is a block diagram of prior art, and FIG. 25 is a flow chart depicting the prior art.

As FIG. 24 shows, the storage controller 100 controls access to a plurality of storage devices (magnetic disk devices) 110 according to host I/O commands. This storage controller 100 has a command processing function 102, DTC function 104, disk driver 106 and device adaptor 108. The command processing function 102 receives the host I/O commands and internal I/O commands.

An internal I/O command is an I/O control which is executed in the background of the host I/O, such as OPC (One Point Copy), which executes copying sequentially in the background of the host I/O according to a copy instruction of the continuous block group from the host, rebuild for rebuilding the RAID, and copy back for writing data on the spare disk used for rebuilding back to a new disk which was replaced by a maintenance operation.

The DTC function 104 controls the number of commands to be issued to the storage device 110 via the driver 106 and device adaptor 108. As FIG. 25 shows, in prior art, the DTC function 104 measures the response time of each command (time from issuing a command to the storage device 110 to receiving a response from the storage device 110), calculates the average response time, increases the number of commands to be issued in unit time if this average response time is shorter than a predetermined time, and decreases the number of commands to be issued in unit time if the average response time is longer than the predetermined time. Commands which exceed the determined number of commands to be issued are queued.

The command processing function 102 processes the host I/O (random, sequential) with priority without any acceptance restriction, and transfers the host I/O to the DTC 104. An internal I/O is processed in the background of the host I/O, and is transferred to the DTC 104. The DTC 104 issues commands to the storage device 110 via the driver 106 and device adaptor 108, within the range which does not exceed the above mentioned number of commands to be issued.

In this way, the DTC 104 dynamically changes the number of activations (number of commands) according to the response time of the storage device 110 to optimize the execution of I/O commands (e.g. Japanese Patent Application Laid-Open No. 2001-43032).

In prior art, one or more commands are managed as a group for each physical disk, based on time, assuming that the processing sequence does not change beyond this group. In other words, it is checked whether disk processing completes within a predetermined time from the processing time of the disk device, and as the processing time becomes shorter, the number of disk requests to be issued is increased.

In a RAID configuration which performs stripe control, however, the data is distributed into a plurality of disks, so even if load control is performed for an individual disk, the load control is not reflected in the response time as the RLU (Raid Logical Unit) corresponding to the RAID group. In other words, in the case of control in an RLU unit, the processing sequence is not guaranteed, and one processing may be completed by accessing a plurality of disks, so simply measuring the processing time is not sufficient for effective functioning.

In other words, in the case of conventional DTC control using time, a temporary delay of a disk may cause a delay in other processing, and a time out of the host I/O tends to occur.

SUMMARY OF THE INVENTION

With the foregoing in view, it is an object of the present invention to provide a storage system for efficiently controlling the load balance of the disk in a RAID configuration, and the disk load balance control method thereof.

It is another object to provide a storage system for preventing a time out caused by a delay of command processing of the host I/O in the RAID configuration, and the disk load balance control method thereof.

It is still another object of the present invention to provide a storage system for performing load management for host I/O requests and internal I/O requests in good balance in the RAID configuration, and preventing a time out caused by a processing delay of an accepted host I/O without interrupting the host I/O processing, and the disk load balance control method thereof.

It is still another object of the present invention to provide a storage system for decreasing the overhead of the DTC processing and using the performance of the storage device at full scale, and the disk load balance control method thereof.

It is still another object of the present invention to provide a storage system for performing optimum write back schedule control using the disk load balance, and the disk load balance control method thereof.

To achieve these objects, the storage system of the present invention is a storage system for accessing a connected disk device according to an I/O request requested from the host and an I/O request generated inside the storage system and executing the I/O requests, having a command processing section for executing command processing according to the I/O request, and an access execution section for issuing an access request to the disk device according to the processing result. And the access execution section restricts the number of requests in-process which were issued to the disk device and for which the disk device has not completed the access processing for the number of access requests by the host I/O request, and the number of access requests by the internal I/O request individually.

The disk load balance control method of the present invention is a method for accessing a connected disk device according to an I/O request requested from the host and an I/O request generated inside a storage system and executing the I/O requests, having a step of issuing an access request to said disk device according to the I/O request, and a step of restricting the number of requests in-process which were issued to the disk device and for which the disk device has not completed the access processing for the number of access requests by the host I/O request, and the number of access requests by one internal I/O request individually.

In the present invention, the load of the host I/Os (host read) and internal I/Os (pre-fetch and write back) are individually managed, so the number of processing requests to be issued to the virtual disk (RLU) can be individually restricted, and the balance of the host I/Os and the internal I/Os can be controlled with assigning priority to the host I/Os.

In the present invention, it is preferable that the access execution section has a first counter for counting the number of access requests in-process by the host I/O request, and a second counter for counting the number of access requests in-process by the internal I/O request, and the access execution section judges whether the I/O request is an access request by the host I/O request or an access request by the internal I/O request, and restricts the number of requests in-process individually referring to the first or second counter according to the judgment result. From this aspect, the number of requests in-process is managed individually by the counters and is restricted, so the number of requests in-process can be individually restricted easily and accurately.

Also in the present invention, it is preferable that the access execution section has a first queue for queuing the access requests by the host I/O requests, which exceed the limit value of the number of access requests in-process by the host I/O request, and a second queue for queuing the access requests by the internal I/O requests, which exceed the limit value of the number of access requests in-process by the internal I/O request. From this aspect, the queued access requests are also individually managed, so the individual management of the requests in-process can also be applied to the queued access requests.

Also in the present invention, it is preferable that the access execution section has a first list of the access requests in-process by the host I/O request and a second list of the access requests in-process by the internal I/O request, and when the access requests are received, the access execution section judges the priority of the access requests, referring to the first or second list, and issues the access request with high priority to the disk device. From this aspect, I/O priority control is possible while the host I/Os and the internal I/Os are individually managed.

Also in the present invention, it is preferable that said access execution section stores the access requests in the first list and the second list in the sequence of the priority. By this, I/O priority judgment becomes easy, and the speed of I/O priority control can be increased.

Also in the present invention, it is preferable that the access execution section increments the first or second counter when the access request is issued to the disk device, and decrements the first or second counter when the response to the access request is received from the disk device. By this, the number of requests in-process can be individually restricted accurately.

Also in the present invention, it is preferable that the access execution section issues the access requests in the RLU units which logically indicate the disk devices. By this, load management in the RAID configuration becomes easy.

Also in the present invention, it is preferable that the access execution section issues at least one access request for rebuild and copy back each time a predetermined number of access requests are issued. By this, the completion time of rebuild/copy back can be guaranteed while maintaining the response of the host I/O.

Also in the present invention, it is preferable that the access execution section issues at least one access request for rebuild and copy back when the number of requests in-process is zero for both the host I/O request and the internal I/O request. By this, the completion time of rebuild/copy back can be further guaranteed while maintaining the response of the host I/O.

Also in the present invention, it is preferable that the access execution section holds at least one access request for rebuild and copy back in a queue when a predetermined number of access requests are not issued. By this, the completion of rebuild/copy back can be guaranteed while maintaining the response of the host I/O without changing the schedule of rebuild/copy back.

Also in the present invention, it is preferable that the command processing section executes write back request processing, which is an internal I/O request, according to a predetermined schedule, and in the write back request processing, receives the load status in the RLU units to which logically indicate the disk devices from the access execution section, and issues a write back request prioritizing an RLU with less load of the internal I/O request.

Also in the present invention, it is preferable that the access execution section judges that the load is relatively light when the number of internal I/Os in a queue for the target RLU is small, and allows to issue the write back request for the target RLU in the write back request processing.

Also in the present invention, it is preferable that the access execution section judges the load status of the RLU from the comparison result between the number of write back requests in the access execution section and the write back allowable value based on the upper limit of the number of the internal I/Os in-process, when the number of internal I/Os in a queue for the target RLU is high.

As described above, according to the present invention, the load of the host I/Os (host read) and the internal I/Os (pre-fetch, write back) are individually managed, so the number of processing requests to be issued to the virtual disk (RLU) 2 can be individually restricted, and the load balance between the host I/Os and the internal I/Os can be controlled with assigning priority to the host I/Os.

Also a dedicated load control mechanism is disposed for rebuild and copy back, where the load is adjusted between normal I/Os and rebuild/copy back, so the completion time of rebuild/copy back can be guaranteed while maintaining a certain-degree of response of the host I/Os.

Also a write back is performed assigning priority to an RLU with a light load, so disk devices can be effectively used, and a necessary cache area can be released soon.

DESCRIPTION OF THE DRAWINGS

FIG. 3 is a diagram depicting a detailed configuration of the ACB in FIG. 2;

FIG. 4 is a diagram depicting the load restriction mechanism in FIG. 2;

FIG. 5 is a diagram describing the host I/O and the internal I/O in FIG. 2;

DESCRIPTION OF THE PREFERRED EMBODIMENTS

Embodiments of the present invention will now be described in the sequence of a storage system: first embodiment of dynamic traffic control; second embodiment of dynamic traffic control; write back schedule control using dynamic load control and other embodiments.

[Storage System]

Figure 1:
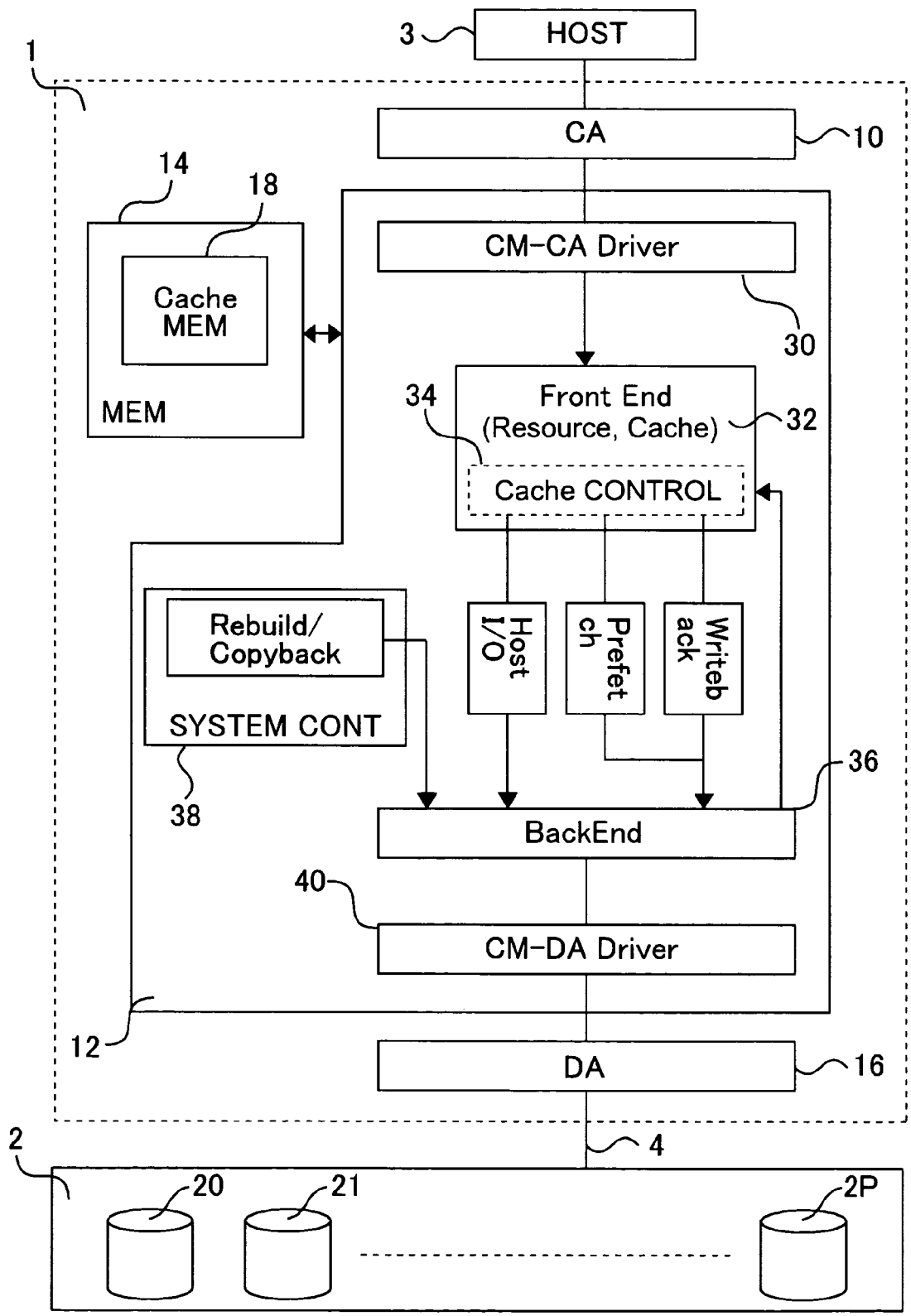
FIG. 1 is a block diagram depicting a storage system according to an embodiment of the present invention.

FIG. 1 is a block diagram depicting a storage system according to an embodiment of the present invention, and shows a RAID (Redundant Arrays of Inexpensive Disks) system using magnetic disks. As FIG. 1 shows, the storage system is comprised of a magnetic disk controller (hereafter called a controller) 1 and a device enclosure 2 which is connected to this controller 1 via the FC_AL (Fiber Channel Arbitrated Loop) 4.

This device enclosure 2 encloses a plurality of magnetic disk devices (storage devices) 20-2P. Each magnetic disk device 20-2P is connected to a pair of FC_AL 4.

The controller 1 is connected to a host 3, such as a client and server, directly or via network equipment, so that a large volume of data of the host 3 can be read or written to the RAID disk drive-(magnetic disk device) randomly at high-speed.

The controller 1 is comprised of function modules of CA (Channel Adaptor) 10, CMs (Centralized Modules) 12 and 14, and DA (Device Adaptor) 16.

The CA (Channel Adaptor) 10 is a circuit which controls the host interface connecting the host, and is comprised of a fiber channel circuit (FC) and DMA (Direct Memory Access) circuit, for example. The DA (Device Adaptor) 16 is a circuit for exchanging commands and data with the disk device for controlling the disk devices (magnetic disk devices) 20-2P, and is comprised of a fiber channel circuit (FC) and DMA circuit, for example.

The CM (Centralized Module) is comprised of a CPU 12, memory (RAM) 14 and program memory, which is not illustrated. The memory 14 is backed up by battery, and a part thereof is used as a cache memory 18.

The control module which the CPU 12 executes is comprised of a CM-CA driver 30 for driving the CA 10, a front end processing module 32 for judging whether access to the storage device is necessary, a back end processing module 36 which executes access processing for the storage device, a CM-DA driver 40 for driving the DA 40, and a system control module 38 for performing system control.

The front end processing module 32 is comprised of a resource module (not illustrated) for managing resources, and a cache control module 34 for referring to the cache memory 18 and performing read, pre-fetch and write back.

Load is applied to the back end processing module 36 by the host I/O, internal I/O attached to the host I/O and internal I/O not attached to the host I/O. Commands attached to the I/O command from the host 3 are a write back (write back from the cache) command after executing a write command, and a pre-fetch (staging the data near the read data in advance) command. Internal commands not attached to the host I/O are the rebuild and copy back commands from the system control module 38.

In the present invention, a DTC module (described later in FIG. 2) for controlling the balance of these I/O requests in the back end processing module 36 is disposed.

The basic operation of this configuration will be described. The cache memory 18 stores a part of the data of the disk device (in RLU unit) which the cache memory 18 charges, and stores the write data from the host and the pre-fetched data. The CPU 12 receives a read request from the host via the CA 10, refers to the cache memory 18, judges whether access to the physical disk is necessary, and requests a disk access request to the DA 16 if necessary. Also the CPU 12 receives a write request from the host, writes the write data to the cache memory 18, and requests such a request as a write back, which is internally scheduled, to the DA 16.

[First Embodiment of Dynamic Traffic Control]

Figure 2:
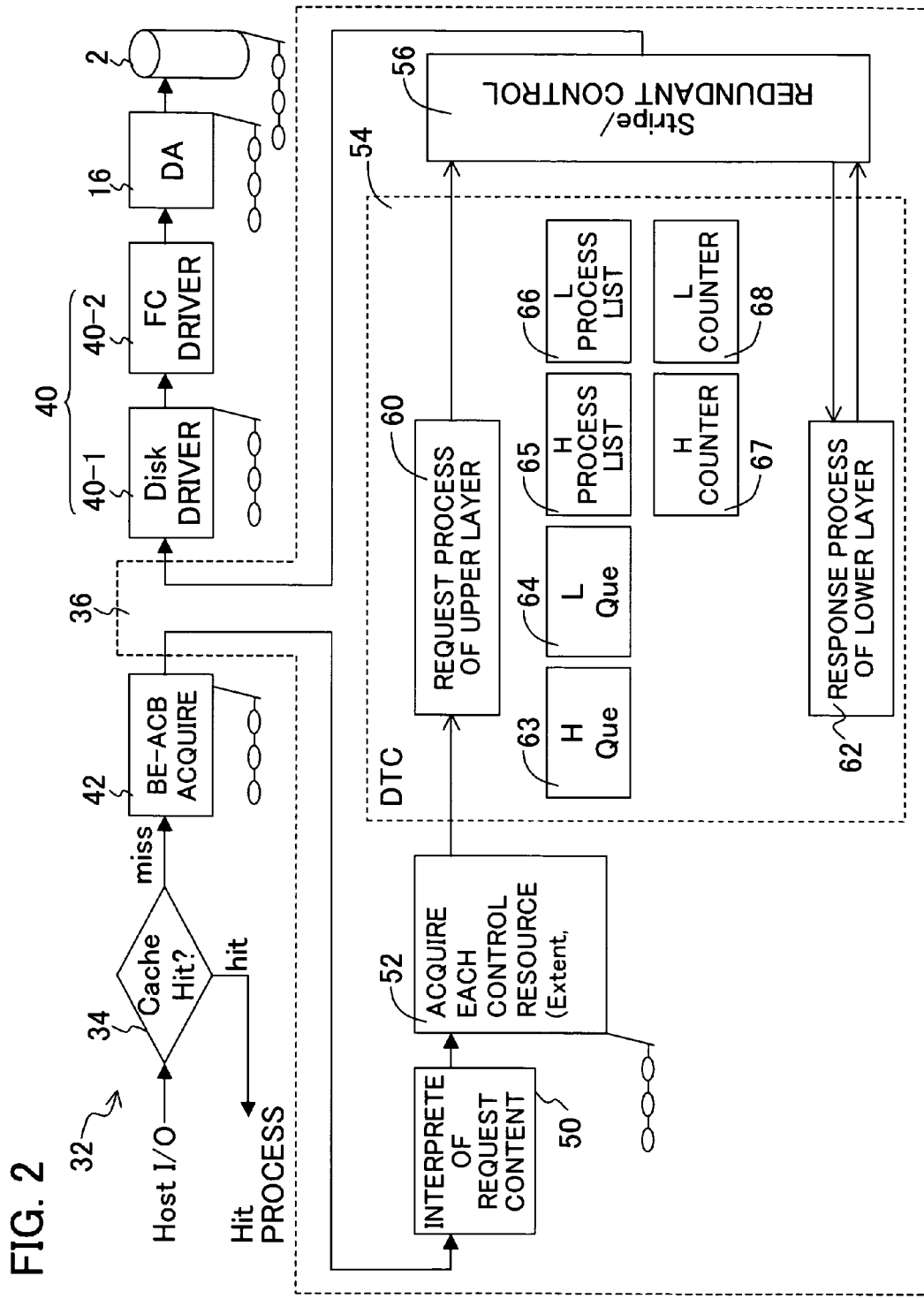
FIG. 2 is a functional block diagram depicting the first embodiment of DTC according to the present invention.

FIG. 2 is a functional block diagram depicting the first embodiment of the dynamic traffic control mechanism (DTC) of the present invention, FIG. 3 is a diagram depicting the ACB thereof, FIG. 4 is a diagram depicting the dynamic traffic control mechanism, and FIG. 5 is a diagram depicting the I/O type in the back end processing.

As FIG. 5 shows, in the present invention, I/O types which are requested to the back end module 36 are classified into host I/Os and internal I/Os. The host I/O is a back end processing which synchronizes with the host I/O request, and the read request of the host and the write request in write through mode fall under this group. The internal I/O is a back end processing of the internal schedule, and pre-fetch and write back fall under this group.

As FIG. 2 shows, when it is judged that the read request of the host is a miss hit (target data does not exist in the cache memory 18) in the cache control module 34 of the front end module 32, or when a pre-fetch due to the read request or a write back due to the write request is generated in the internal schedule, the front end module 32 enables activation to the back end, and in the BE (Back End) —ACB (Access Control Block) acquisition processing 42, BE—ACB (see FIG. 3) is acquired for the I/O command of which activation to the back end is enabled, and access to the back end module 36 is enabled.

As FIG. 3 shows, this ACB is comprised of priority and I/O request content, and priority is always assigned to the host read, and low priority is assigned to internal I/Os other than read. The host 3 assigns the priority of the host read to the read request. For internal I/Os as well, priority is assigned among internal I/Os.

In the back end module 36, interpretation processing 50 is performed for the request content of the I/O command, and according to this interpretation (e.g. I/O type on whether the command is host read or not), acquisition processing 52 for each resource for control is executed. In the resource acquisition processing 52, an internal buffer area (Extent) is acquired, and an exclusive right is set.

After acquiring this resource, load control is performed in the RLU units in DTC (Dynamic Traffic Control) processing 54. The DTC 54 is comprised of a queue 63 of the host I/Os, a queue 64 of the internal I/Os, an in-process list 65 of host I/Os, a host I/O counter 67 for counting the number of I/Os in-process of the list 65, an in-process list 66 of internal I/Os, and an internal I/O counter 68 for counting the number of I/Os in-process of the list 66.

The queues 63 and 64 are queues for waiting and holding I/O requests in the disk device (in RLU unit), and the in-process lists 65 and 66 are lists of the I/O requests which were issued to the disk device (in RLU units), and for which processing has not completed, and the counters 67 and 68 indicate the number of I/O requests which were issued to the disk device (in RLU unit), and for which processing has not completed. In the present invention, host I/Os and internal I/Os are separate elements, as FIG. 4 shows, and the respective number of I/Os issued are individually managed.

Figure 6:
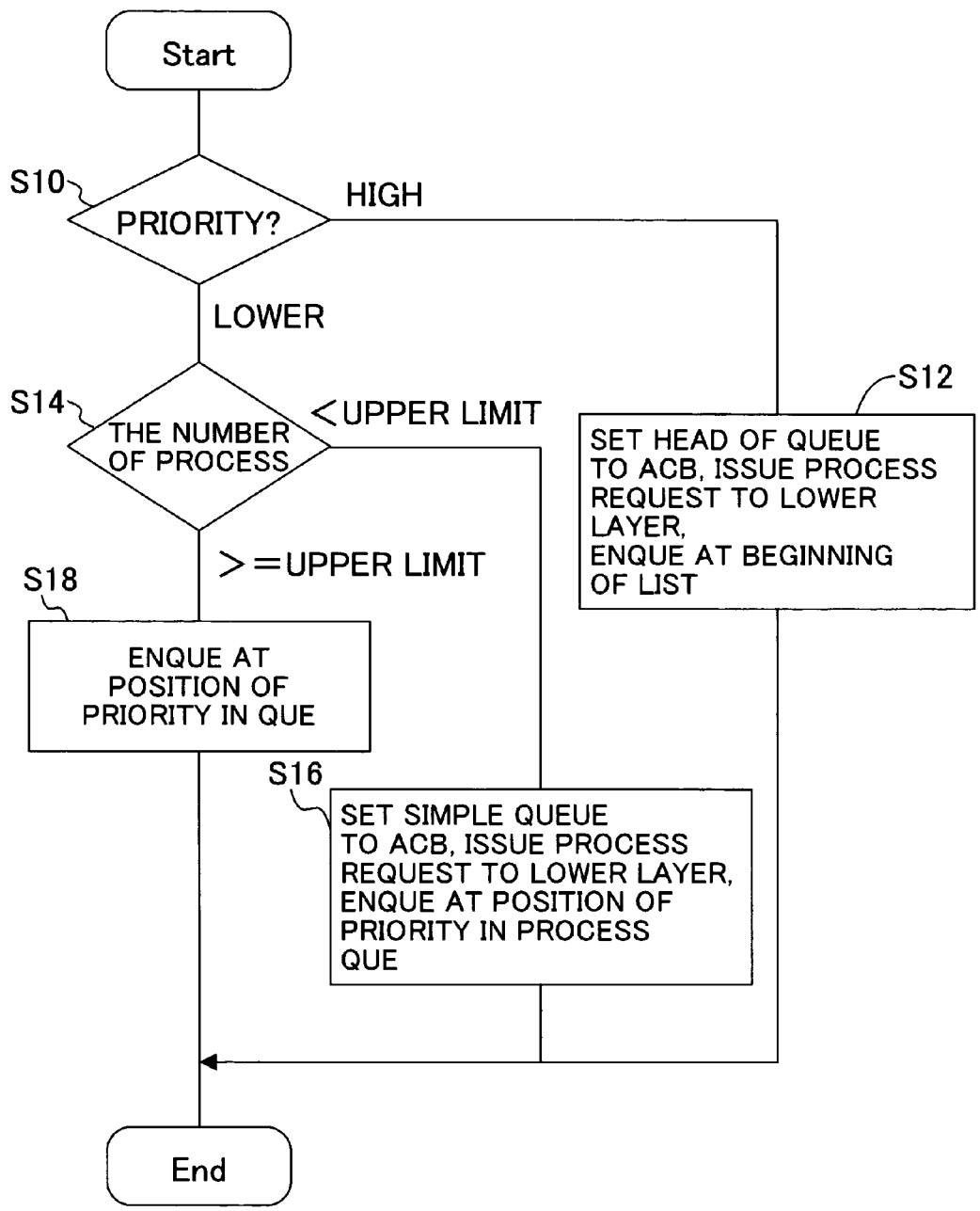
FIG. 6 is a flow chart depicting the request processing from the higher layer of DTC in FIG. 2.

In a request processing 60 from a higher layer, as described in FIG. 6, the issue of I/O requests to a lower layer is controlled referring to the priority and the in-process counters 67 and 68, depending on whether the I/O request from the higher layer is a host I/O or an internal I/O. In a request processing 62 from the lower layer, the issue of the I/O request to the lower layer is controlled referring to the queues 63 and 64, depending on whether the completion response from the lower layer is a host I/O or an internal I/O, as described in FIG. 7.

The back end module 36 further comprises a stripe/redundancy control module 56, and this module 56 divides I/O requests in RLU units into commands in disk units, and issues the disk command to the disk driver 40-1/FC (Fiber Channel) driver 40-2. The disk command is sent from the driver 40 to the DA 16, and the disk command is then transferred to the magnetic disk device 2 (20-2P) via the FC_AL 4. By this, the magnetic disk device 2 (20-2P) executes this disk command. This DA 16 uses a tag (Head of Queue, or Simple Queue) specified by the DTC 54 when the disk command is issued to the magnetic disk device 2. Head of Queue means that the command is en-queued without being a target of reordering on the disk, and Simple Queue means that the command becomes the target of reordering on the disk.

FIG. 6 is a flow chart depicting the request processing from the higher layer in FIG. 2.

(S10) When the I/O request is received from the higher layer, DTC compares the priority of the ACB and the highest priority of the ACB in the in-process list 65 or 66 according to the type of the I/O request (host I/O, internal I/O).

(S12) If the priority of the ACB of the I/O request is higher than the highest priority of the ACB in the in-process list 65 or 66 according to the type of the I/O request (host I/O, internal I/O), then Head of Queue (beginning of queue) is attached to the ACB, and the processing request is issued to the lower layer (stripe/redundancy control module 56 in this case). Also this ACB is enqueued at the beginning of the in-process list 65 or 66 of the I/O type, and the value of the in-process counter 67 or 68 of the I/O type is incremented. And processing ends.

(S14) If the priority of the ACB of the I/O request is lower than the highest priority of the ACB in the in-process list 65 or 66 according to the type of the I/O request (host I/O, internal I/O), then the DTC judges whether the value of the in-process counter 67 or 68 of the I/O type is the upper limit value (n or m).

(S16) If this value is less than the upper limit, Simple Queue (non-special Queue) is attached to the ACB, and the processing request is issued to the lower layer (stripe/redundancy control module 56 in this case). Also this ACB is enqueued at the priority position of the in-process list 65 or 66 of the I/O type. And processing ends.

(S18) If this value is more than the upper limit, the ACB is enqueued at the priority position of the queue 63 or 64 of the I/O type. In other words, in the queue, ACBs are rearranged so that the first ACB becomes the highest priority in the host/internal I/Os of the queue, and ACBs are dequeued from the first ACB, so that the queue is cleared in the sequence of priority. In this way, I/O priority is controlled. And processing ends.

Figure 7:
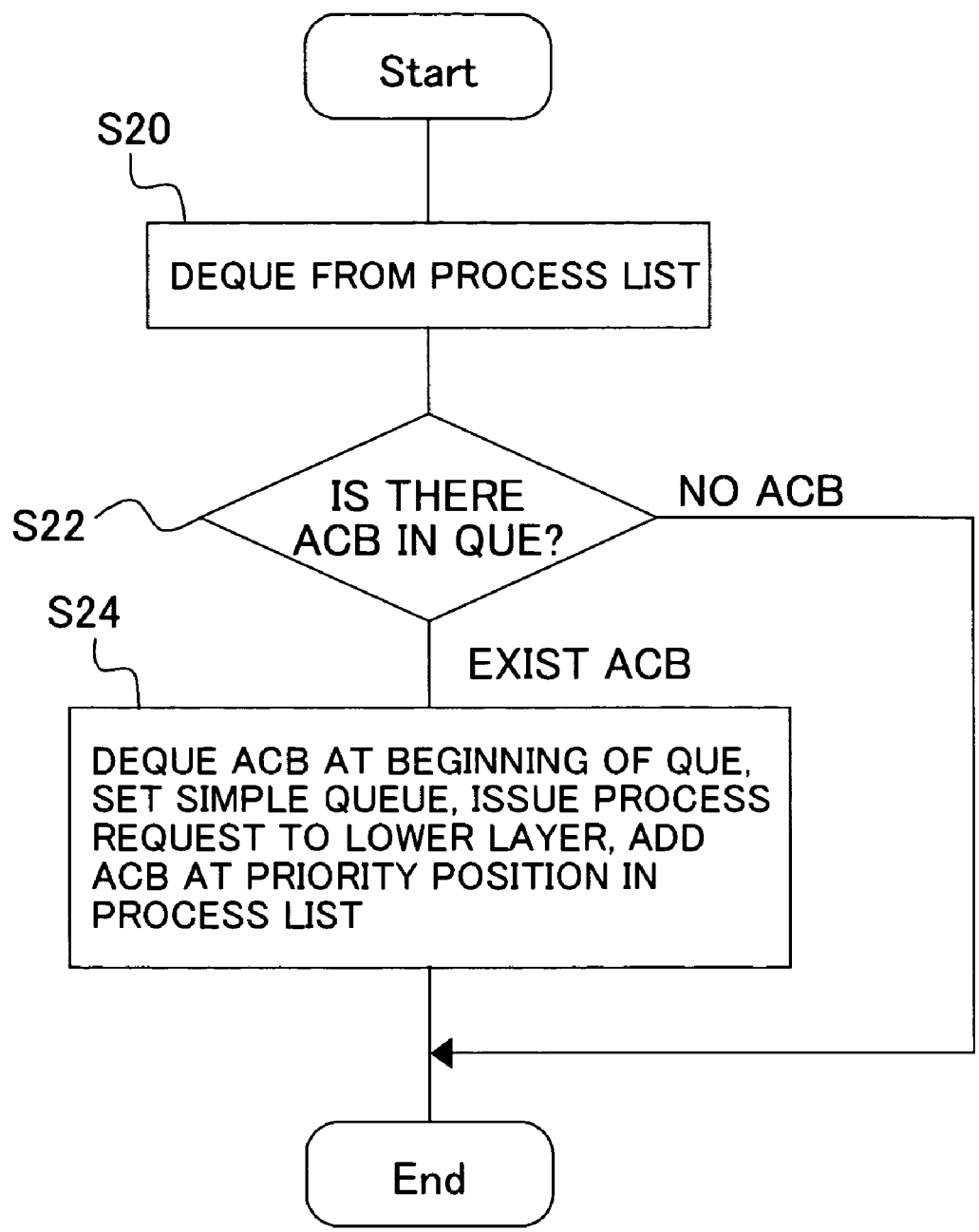
FIG. 7 is a flow chart depicting the response processing from the lower layer of DTC in FIG. 2.

Now response processing from the lower layer in FIG. 2 will be described with reference to FIG. 7.

(S20) The processing completion from the lower layer is notified to DTC along with the ACB. The DTC determines the I/O type from the ACB for which processing completed, and dequeues the ACB for which processing completed from the in-process list (queue) 65 or 66 of the determined I/O type.

(S22) Referring to the queue 63 or 64 of the I/O type, processing ends if there is no ACB held in the queue 63 or 64.

(S24) If there is an ACB held in the queue 63 or 64, on the other hand, the first ACB of the queue 63 or 64 of the I/O type is dequeued, Simple Queue is set for the ACB, and the processing request is sent to the lower layer. This ACB is enqueued in the priority position of the in-process list 65 or 66 of the I/O type, and the value of the in-process counter 67 or 68 of the I/O type is incremented. And processing ends.

Figure 8:
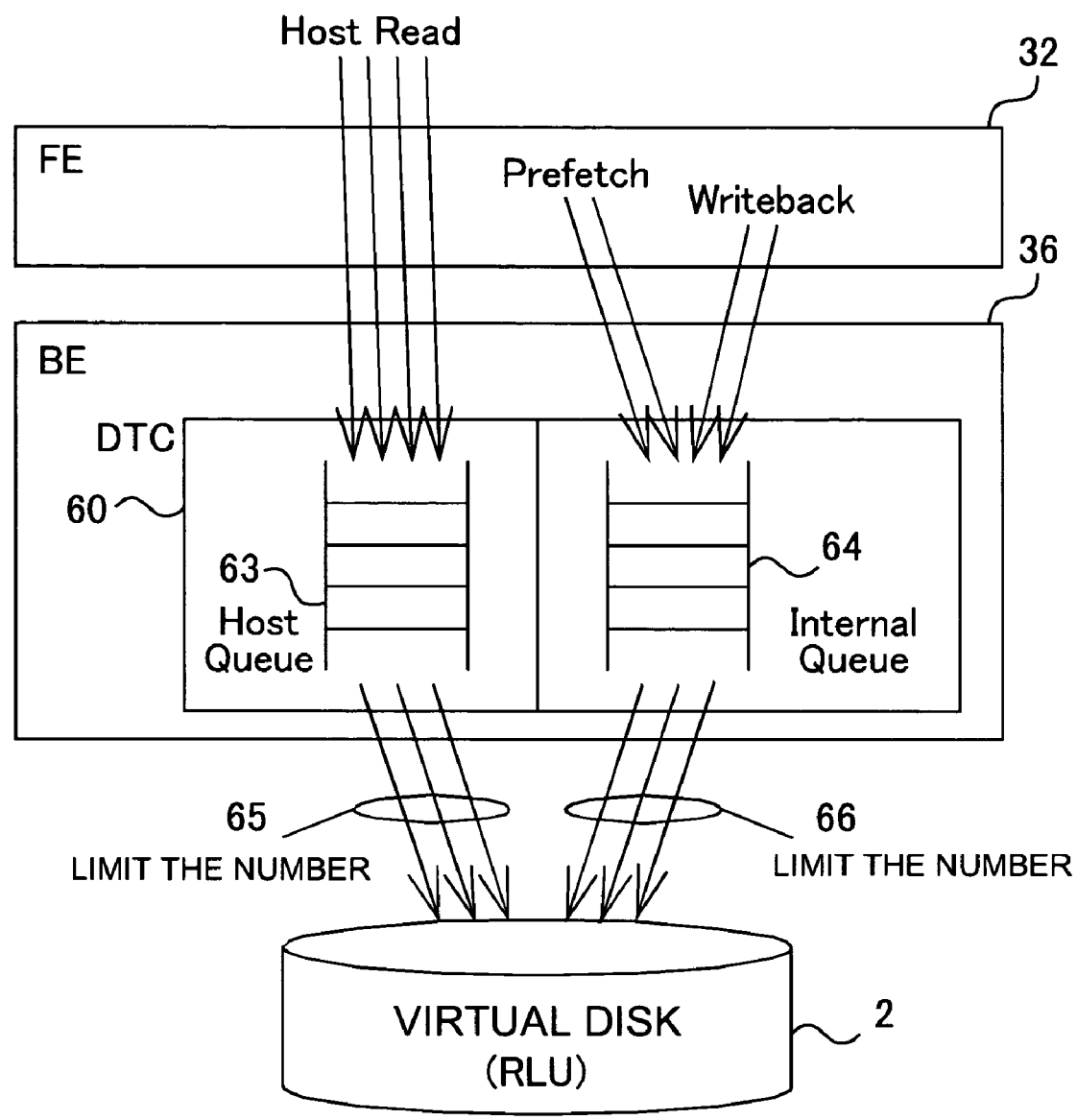
FIG. 8 is a diagram depicting the operation of the first embodiment in FIG. 2.

In this way, the DTC 60 manages the load of the host I/Os (host read) and the internal I/Os (pre-fetch, write back)

individually, so as FIG. 8 shows, the number of processing requests to be issued to the virtual disk (RLU) 2 can be individually restricted. Therefore the balance of the host I/Os and the internal I/Os can be controlled with assigning priority to the host I/Os.

Specifically, the highest priority is assigned to the host I/Os, so the host I/Os are processed with priority on the virtual disk 2, and the host I/Os are issued to the virtual disk 2 while the number of I/Os in-process is restricted. When there are no more host I/Os held in the queue 63, internal I/Os are issued to the virtual disk 2 from the internal I/O queue 64 while the number of I/Os in-process is restricted.

If a host I/O arrives during this time, the host I/O is issued to the virtual disk 2. The host I/O is only waited the number of internal. I/Os in-process at maximum, and the internal I/Os can be executed while preventing a time out of the host I/Os. The disk device 2 has a queue for a maximum of 16 commands, for example, and reorders the commands so that continuous processing can be performed, therefore a conventional I/O request issue control, especially considering continuous processing, is unnecessary.

If host I/Os are processed with priority by reordering, the wait time of a host I/O can be further decreased. Also the number of host I/Os in-process is restricted, so issuing excessive host I/Os beyond processing capacity can be suppressed, and the capability of the disk device can be presented at the maximum level.

Also the queue can be searched depending on the I/O type, so the overhead of the DTC can be decreased, and in both the in-process queue and the waiting queue, requests are stored in the sequence of priority, so subsequent priority judgment of I/O requests becomes easy, and high-speed load balance control becomes possible.

[Second Embodiment of Dynamic Traffic Control]

Figure 9:
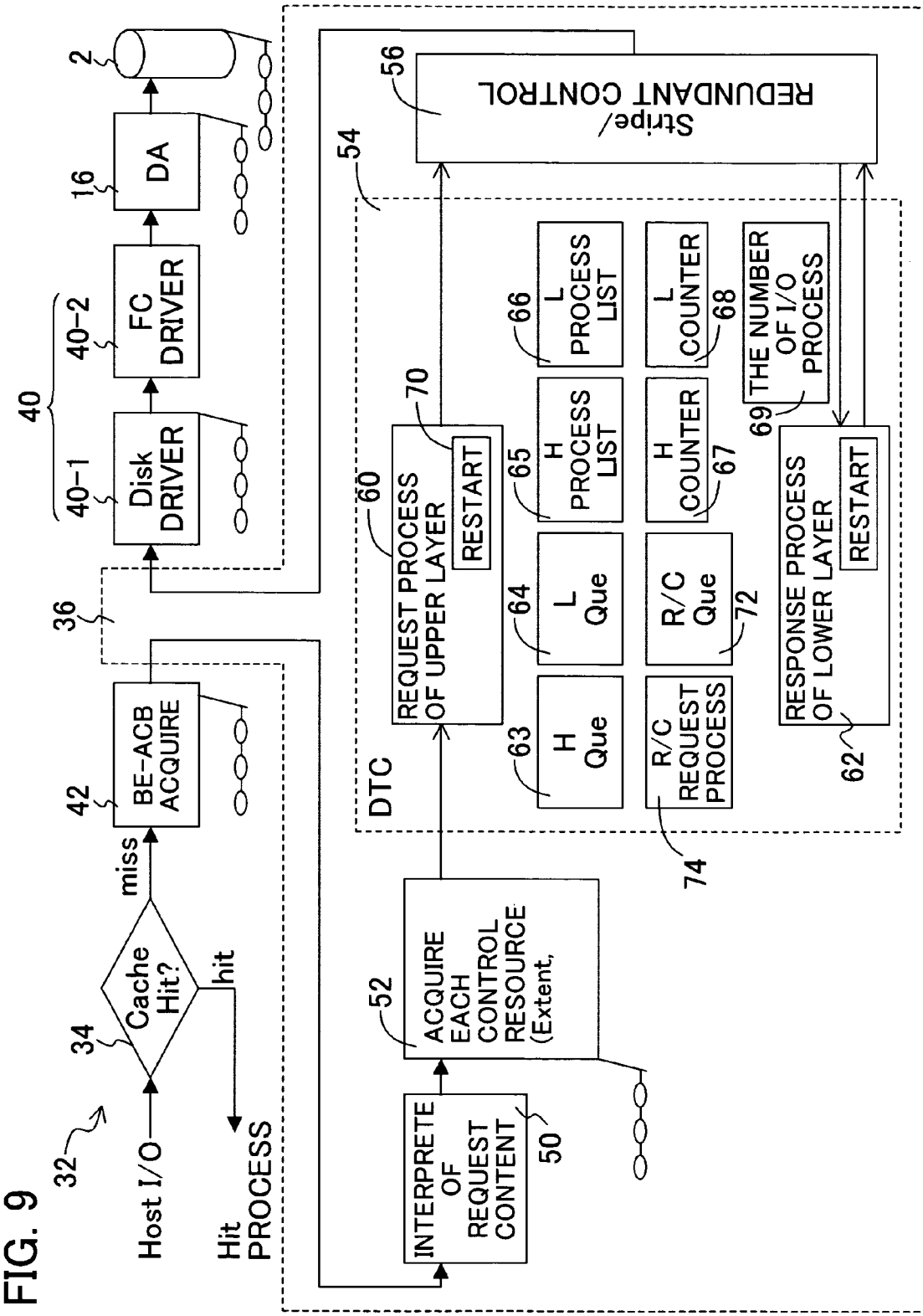
FIG. 9 is a functional block diagram depicting the second embodiment of the DTC of the present invention.
Figure 10:
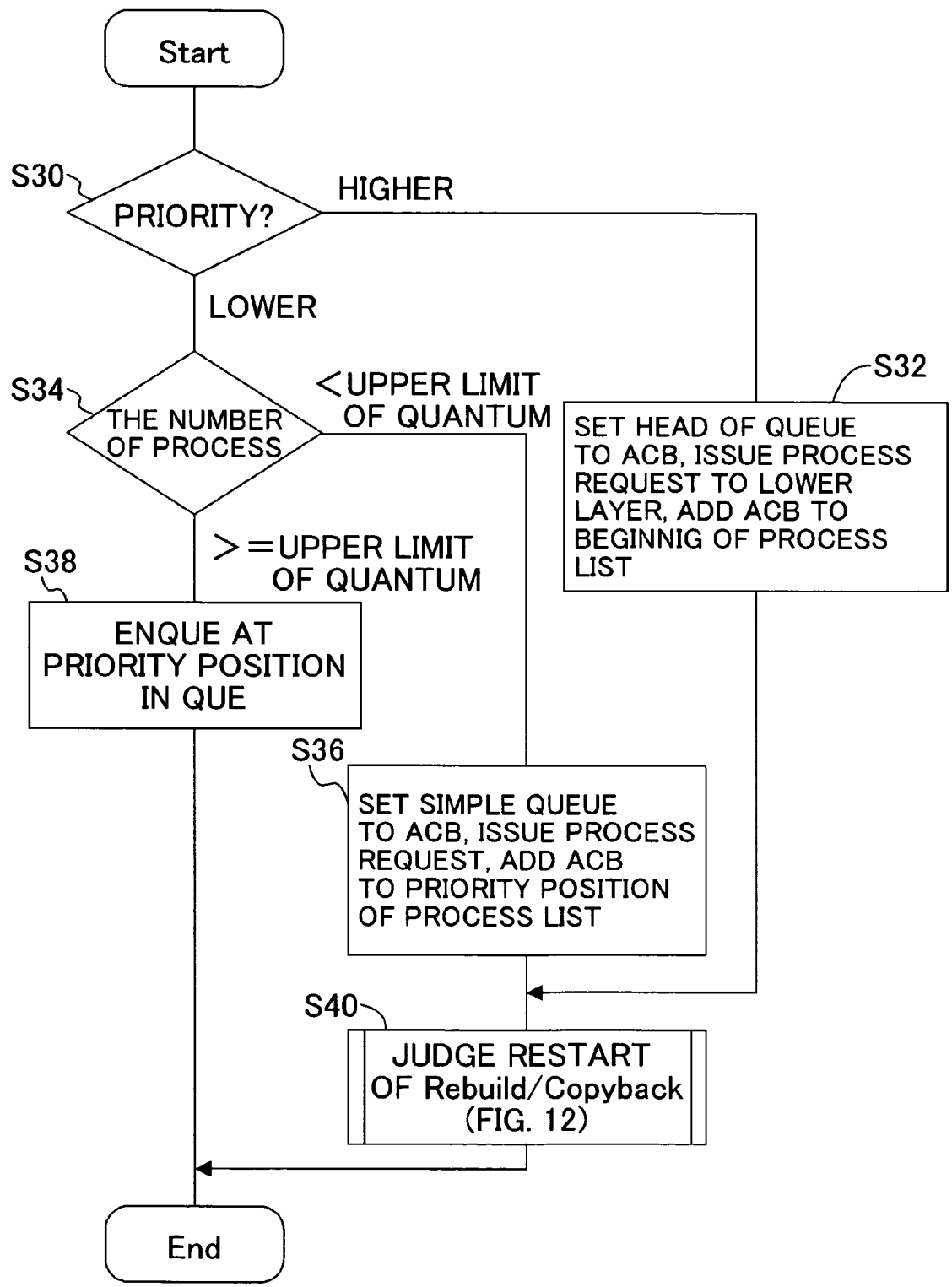
FIG. 10 is a flow chart depicting the request processing from the higher layer of DTC in FIG. 9.
Figure 11:
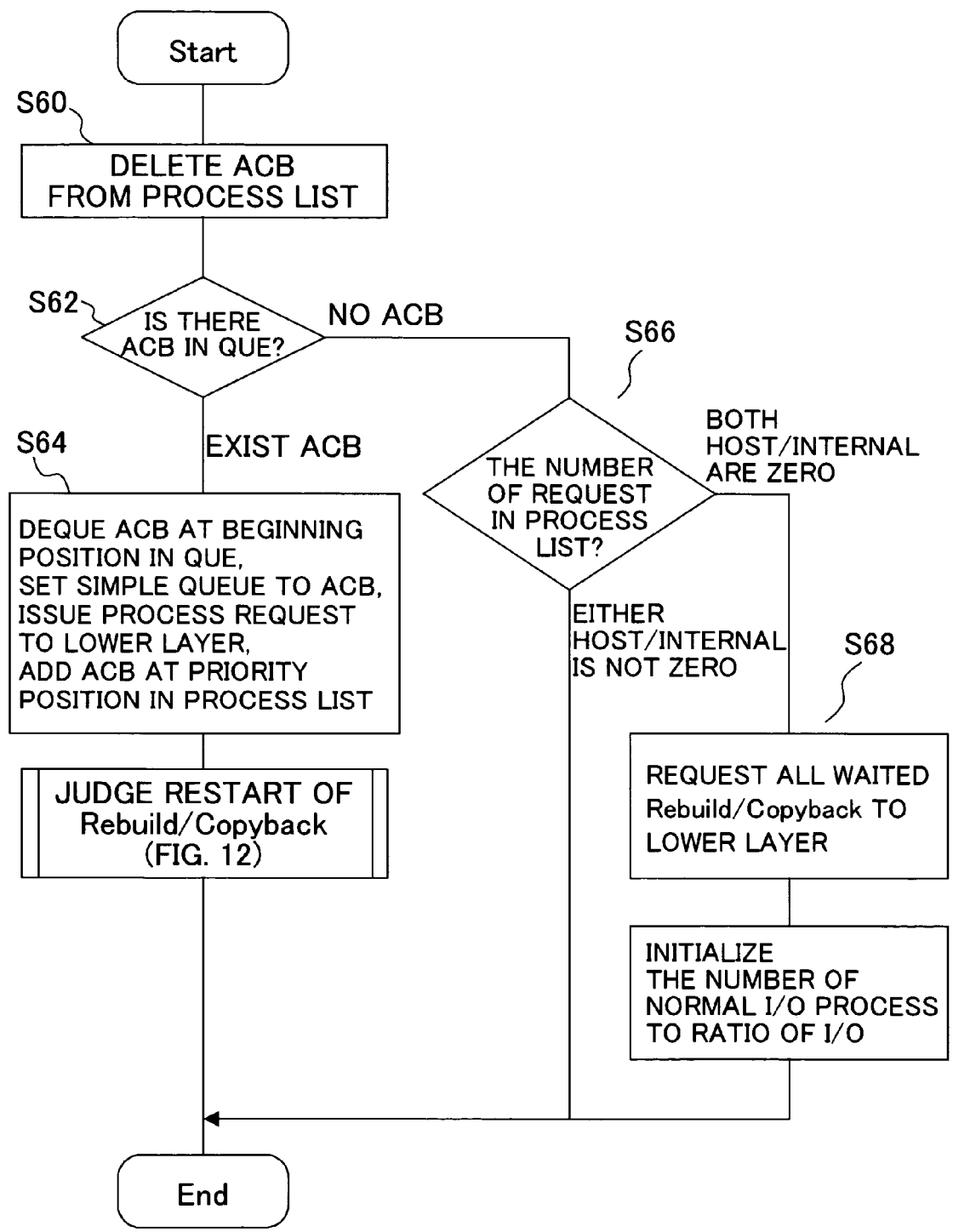
FIG. 11 is a flow chart depicting the response processing from the lower layer of DTC in FIG. 9.
Figure 12:
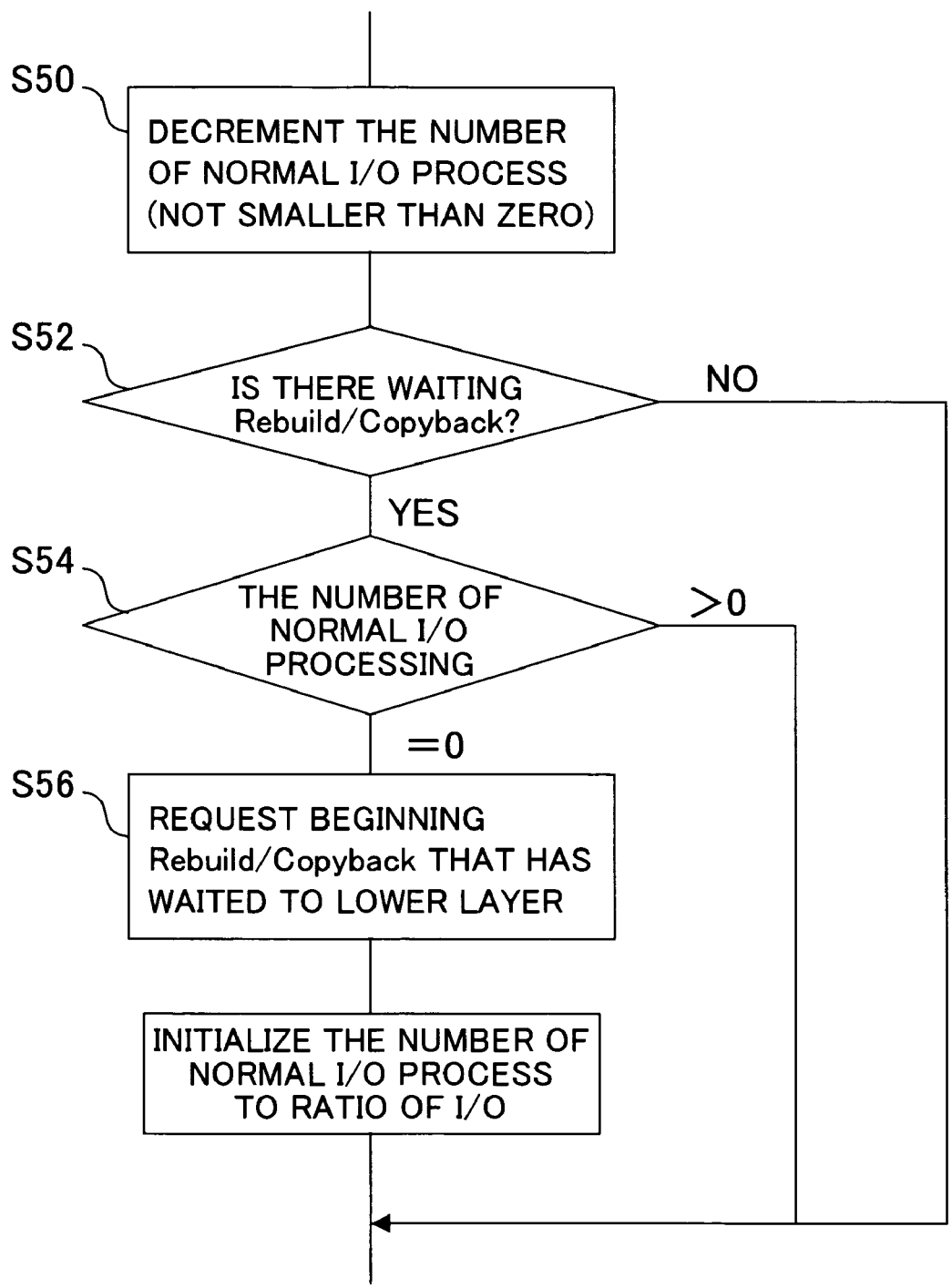
FIG. 12 is a flow chart depicting the rebuild/copy back restart judgment processing in FIG. 10 and FIG. 11.
Figure 13:
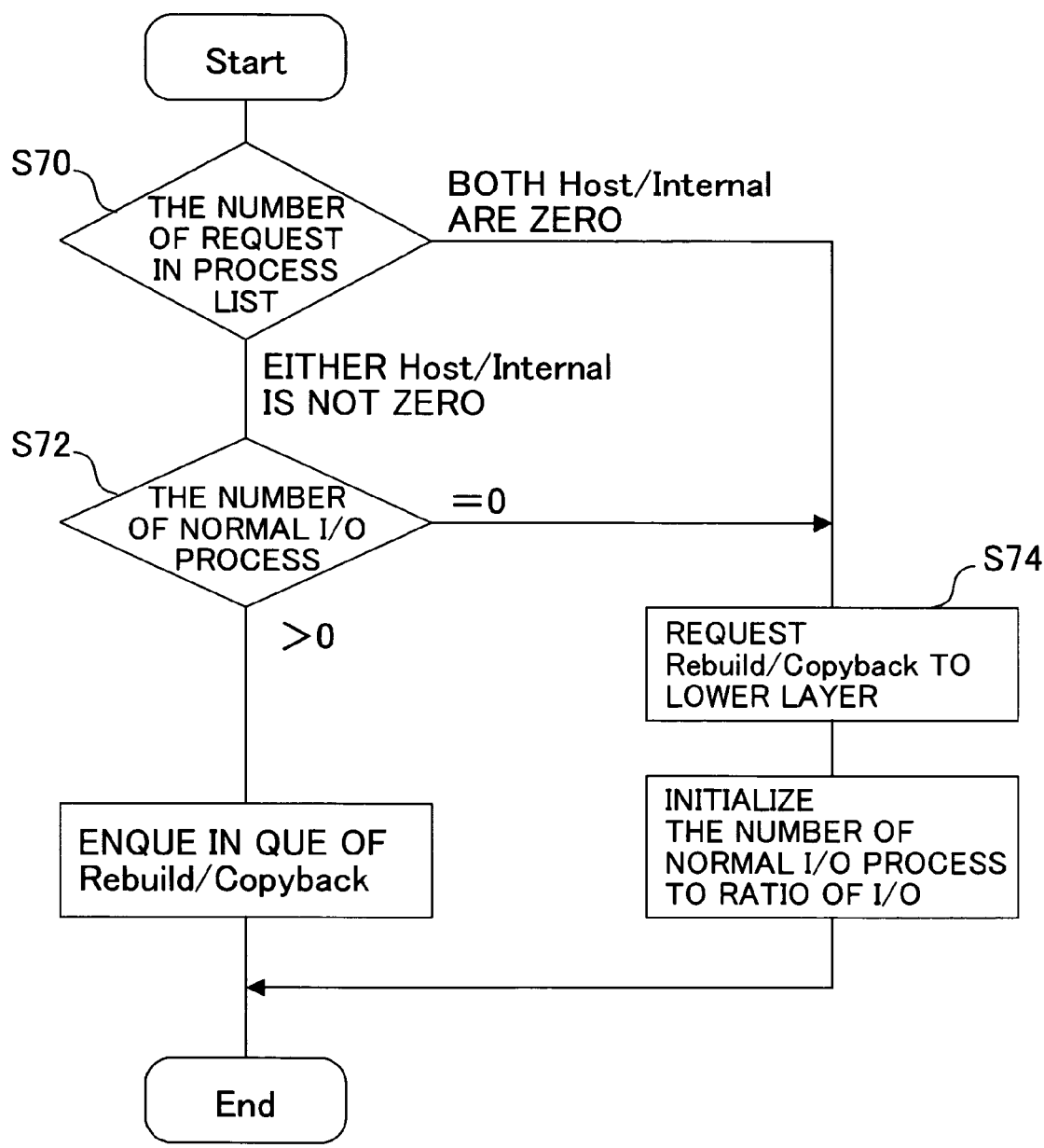
FIG. 13 is a flow chart depicting the rebuild/copy back request processing of DTC in FIG. 9.
Figure 14:
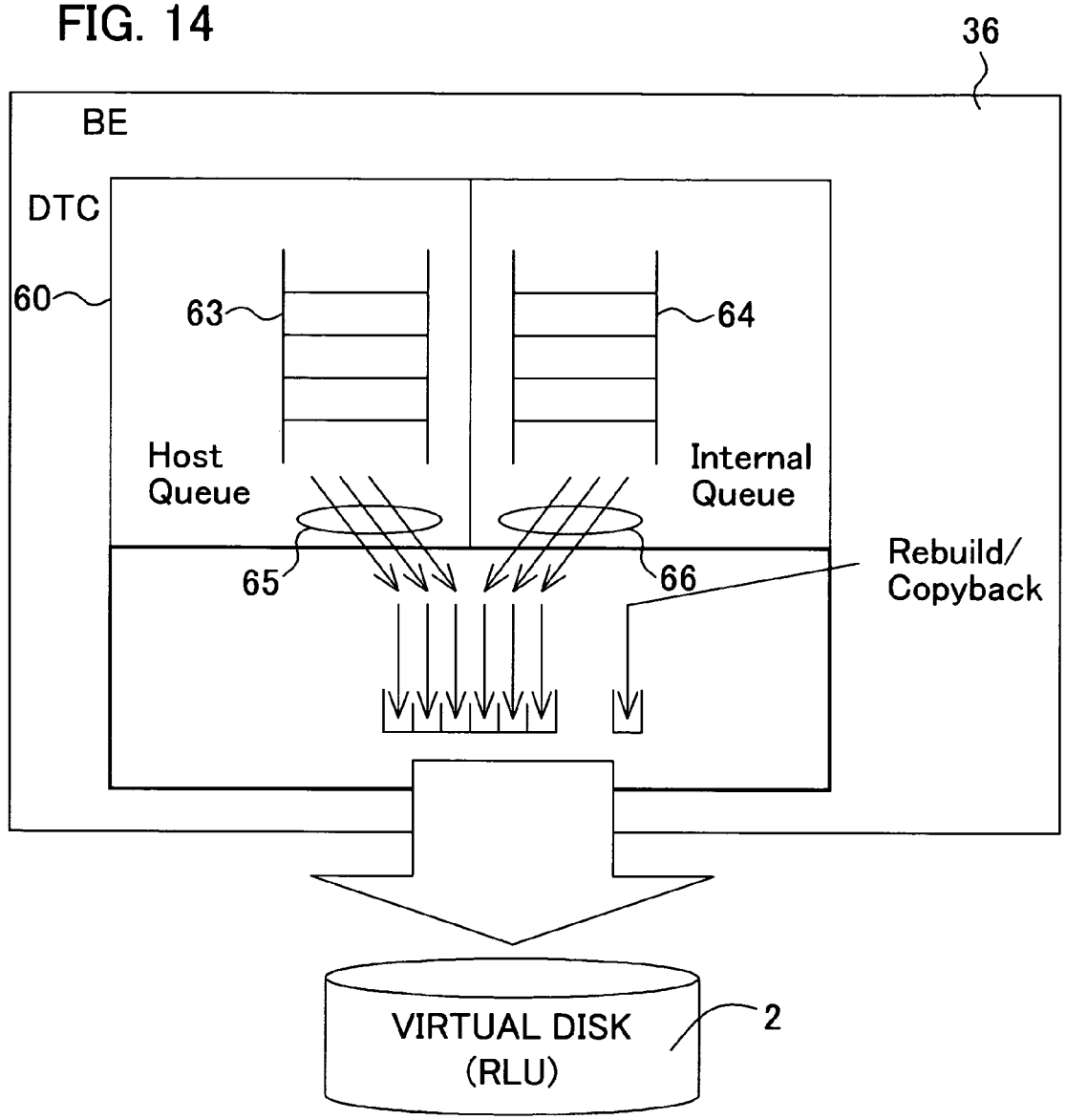
FIG. 14 is a diagram depicting the operation of DTC in FIG. 9.
Figure 15:
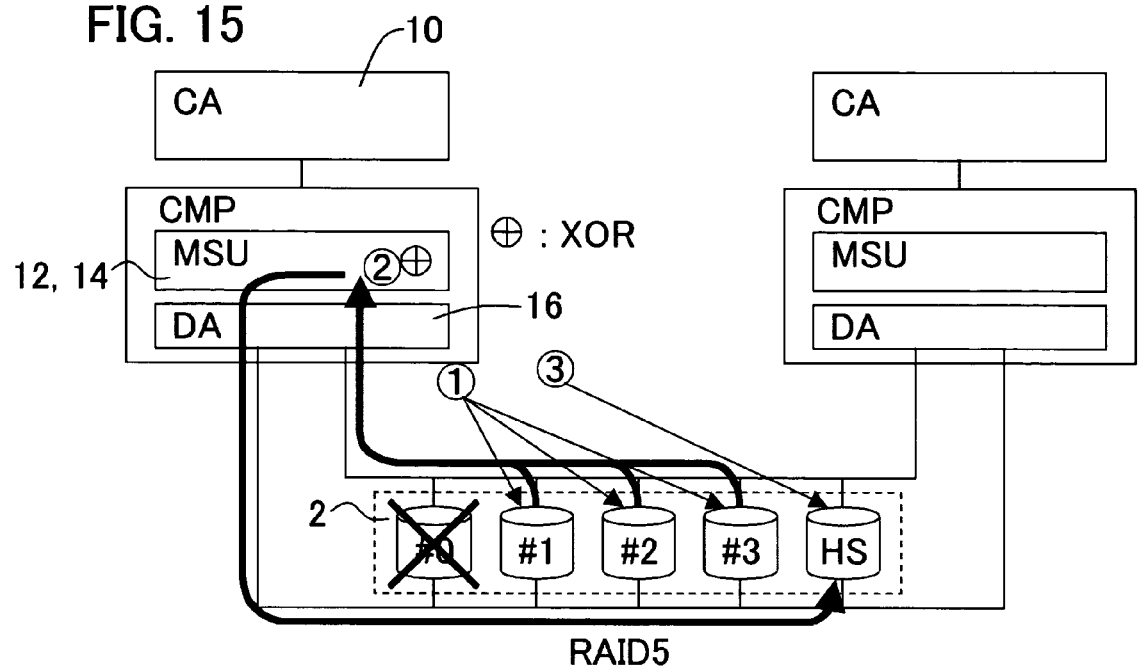
FIG. 15 is a diagram depicting the rebuild operation in FIG. 9.
Figure 16:
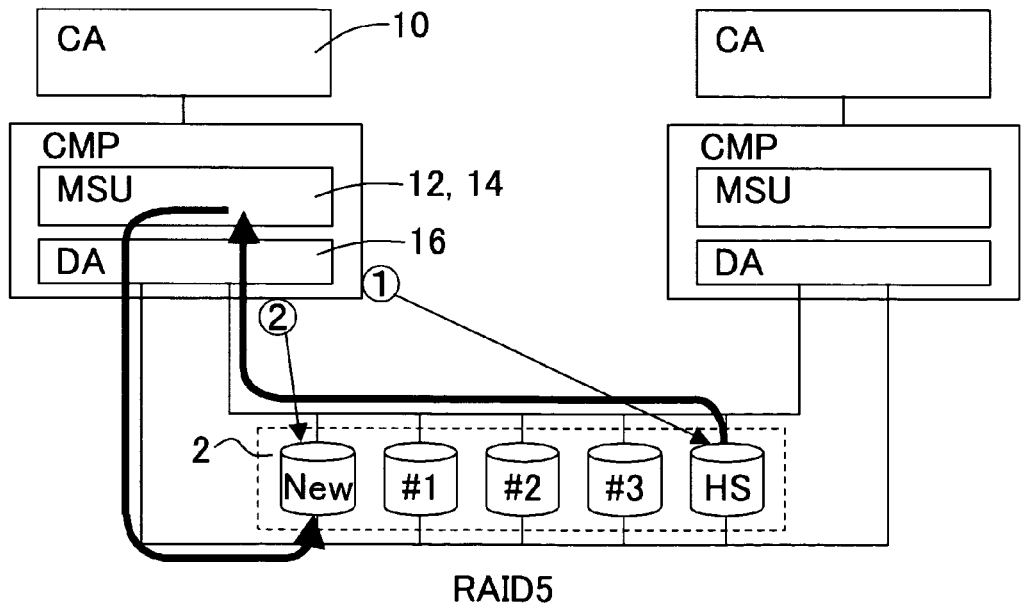
FIG. 16 is a diagram depicting the copy back operation in FIG. 9.

FIG. 9 is a functional block diagram depicting the second embodiment of the dynamic traffic control mechanism (DTC) according to the present invention, FIG. 10 is a flow chart depicting the request processing from the higher layer thereof, FIG. 11 is a flow chart depicting the response processing from the lower layer thereof, FIG. 12 is a flow chart depicting the restart judgment processing in FIG. 10 and FIG. 11, FIG. 13 is a flow chart depicting the rebuild/copy back request processing in FIG. 9, FIG. 14 is a diagram depicting the operation of the second embodiment, FIG. 15 is a diagram depicting the rebuild operation in FIG. 9, and FIG. 16 is a diagram depicting the copy back operation.

As shown in FIG. 5, in the present invention, the I/O types, which are requested to the back end module 36, are classified into host I/Os and internal I/Os. A host I/O is a back end processing which synchronizes with the host I/O request, and a read request of the host and a write request in write through mode fall under this. An internal I/O is a back end processing of the internal schedule, and pre-fetch and write back fall under this.

In this embodiment, a dedicated load control mechanism for rebuild/copy back is disposed in addition to the first embodiment described in FIG. 2. As FIG. 15 shows, the rebuild operation is for restoring the data of a failed disk and storing the data to a spare or new disk. FIG. 15 shows the rebuild operation of RAID 5, where the data of the disks #1 –#3, other than the failed disk #0, is read to the cache memory, XOR of the data is determined, restored data is created, and the restored data is written to the spare or new disk HS.

The copy back operation, on the other hand, is for copying data to the copy disk, as shown in FIG. 16. In other words, FIG. 16 indicates the copy back operation of the RAID 5, where the data of the disk HS is read to the cache memory, and is written to the new disk New.

In this embodiment, the response of the host I/O is maintained while guaranteeing the completion time of rebuild/copy back.

As FIG. 9 shows, when it is judged that the read request of the host is a miss hit (the target data does not exist in the cache memory 16) in the cache control module 34 of the front end module 32, or when a pre-fetch due to a read request or a write back due to a write request is generated in the internal schedule, or when a rebuild/copy back request is generated in the schedule of the system control module 38, the front end module 32 enables activation to the back end, and in the BE (Back End)—ACB (Access Control Block) acquisition processing 42, BE—ACB (see FIG. 3) is acquired for the I/O command of which activation is enabled to the back end, and access to the back end module 36 is enabled.

As shown in FIG. 3, this ACB is comprised of priority and I/O request content, and priority is always assigned to the host read, and low priority is assigned to the internal I/Os other than read. The host 3 assigns the priority of the host read to the read request. For the internal I/Os as well, the priority is assigned among internal I/Os.

In the back end module 36, interpretation processing 50 is performed for the request content of the I/O command, and according to this interpretation (e.g. I/O type on whether the command is host read, internal I/O or rebuild/copy back), acquisition processing 52, for each resource for control, is executed. In the resource acquisition processing 52, an internal buffer area (Extent) is acquired, and an exclusive right is set.

After acquiring this resource, load control is performed in the RLU units in DTC (Dynamic Traffic Control) processing 54. The DTC 54 is comprised of a queue 63 of host I/Os, a queue 64 of internal I/Os, an in-process list 65 of the host I/Os, a host I/O counter 67 for counting the number of I/Os in-process of the list 65, an in-process list 66 of internal I/Os, and an internal I/O counter 68 for counting the number of I/Os in-process of the list 66. In the second embodiment, the DTC 54 further comprises a queue 72 for rebuild/copy back.

The queues 63, 64 and 72 are queues for waiting and holding the I/O requests in the disk device (in RLU unit), and the in-process lists 65 and 66 are lists of the I/O requests which were issued to the disk device (in RLU unit), and for which processing has not completed, and the counters 67 and 68 indicate the number of I/O requests which were issued to the disk device (in RLU unit) and for which processing has not completed. In this embodiment, host I/Os and internal I/Os have separately these elements, as shown in FIG. 4, and the respective number of I/Os issued are individually managed.

In the request processing 60 from the higher layer, as described in FIG. 10, the issue of I/O requests to the lower layer is controlled referring to the priority and the in-process counters 67 and 68 depending on whether the I/O request from the higher layer is a host I/O or an internal I/O, and also rebuild/copy back restart judgment processing 70 (described later in FIG. 12) is executed. In the request processing 62 from the lower layer, the issue of the I/O request to the lower layer is controlled referring to the queues 63 and 64 depending on whether the completion response from the lower layer is a host I/O or an internal I/O, as described in FIG. 11, and rebuild/copy back restart judgment processing 70 is executed.

Also the I/O processing counter 69 and the module 74 (described later in FIG. 13) which-performs rebuild/copy back request processing using this I/O processing counter 69, are disposed.

The back end module 36 further comprises a stripe/redundancy control module 56, and this module 56 divides the I/O requests in RLU units into commands in disk units, and issues the disk command to the disk driver 40-1/FC (Fiber Channel) driver 40-2. The disk command is sent from the driver 40 to the DA 16, and the disk command is then transferred to the magnetic disk device 2 (20-2P) via the FC_AL 4. By this, the magnetic disk device 2 (20-2P) executes this disk command.

FIG. 10 is a flow chart depicting the request processing from the higher layer in FIG. 9.

(S30) When the I/0 request is received from the higher layer, the DTC compares the priority of the ACB and the highest priority of the ACB in the in-process list 65 or 66 according to the type of the I/O request (host I/O, internal I/O).

(S32) If the priority of the ACB of the I/O request is higher than the highest priority of the ACB in the in-process list 65 or 66 according to the type of the I/O request (host I/O, internal I/O), then the Head of Queue (beginning of the Queue) is attached to the ACB, and the processing request is issued to the lower layer (stripe/redundancy control module 56 in this case). Also this ACB is en-queued in the beginning of the in-process list 65 or 66 of the I/O type, and the value of the in-process counter 67 or 68 of the I/O type is incremented. And processing advances to step S40.

(S34) If the priority of the ACB of the I/O request is lower than the highest priority of the ACB in the in-process list 65 or 66 according to the type of the I/O request (host I/O, internal I/O), then the DTC judges whether the value of the in-process counter 67 or 68 of the I/O type is the upper limit (n or m).

(S36) If this value is less than the upper limit, Simple Queue (non-special Queue) is attached to the ACB, and the processing request is issued to the lower layer (stripe/redundancy control module 56 in this case). Also this ACB is en-queued at the priority position of the in-process list 65 or 66 of the I/O type. And processing advances to step S40.

(S38) If this value is more than the upper limit, the ACB is en-queued at the priority position of the queue 63 or 64 of the I/O type. In other words, in the queue, ACBs are rearranged so that the first ACB becomes the highest priority in the host I/Os or internal I/Os of the queue, and ACB is de-queued from the first ACB, so that the queue is cleared in the sequence of priority. In this way, I/O priority is controlled. And processing ends.

(S40) Rebuild/copy back restart judgment processing in FIG. 12 is executed, and processing ends.

Now rebuild/copy back restart judgment processing will be described with reference to FIG. 12.

(S50) The number of processings of the counter 69 for counting the number of processings (number of I/O requests issued to DA 16) of normal I/Os (host/internal I/Os) is decremented "1".

(S52) Referring to the queue 72 of rebuild/copy back, it is judged whether there are rebuild/copy back requests in the queue 72, and if there are no rebuild/copy back requests in the queue, restart judgment processing ends.

(S54) It is judged whether the number of normal I/O processings of the counter 69 is "0". If not "0" restart judgment processing ends.

(S56) If the number of normal I/O processings of the counter 69 is "0", a predetermined number of normal I/O processings have executed, so the first rebuild/copy back of the queue 72 of rebuild/copy back is requested to the lower layer, the number of normal I/O processings of the counter 69 is initialized to a predetermined I/O ratio (e.g. 45), and restart judgment processing ends.

Now the response processing from the lower layer in FIG. 9 will be described with reference to FIG. 11.

(S60) The processing completion from the lower layer is notified to DTC along with the ACB. The DTC determines the I/O type from the ACB for which processing completed, and de-queues the ACB for which processing completed from the in-process list (queue) 65 or 66 of the determined I/O type.

(S62) Referring to the queue 63 or 64 of the I/O type, processing advances to step S66 if there is no ACB held in the queue 63 or 64.

(S64) If there is an ACB held in the queue 63 or 64, on the other hand, the first ACB of the queue 63 or 64 of the I/O type is de-queued, Simple Queue is set for the ACB, and the processing request is sent to the lower layer. This ACB is en-queued in the priority position of the in-process list 65 or 66 of the I/O type, and the value of the in-process counter 67 or 68 of the I/O type is incremented. And rebuild/copy back restart judgment processing in FIG. 12 is executed, and processing ends.

(S66) If there is no ACB held in the queue 63 or 64, it is judged whether the number of requests in-process is "0" for both the host and internal I/Os referring to the in-process counters 67 and 68, and if the number of requests in-process is not "0" for at least one of host and internal I/Os then processing ends.

(S68) If the number of requests in-process is "0" for both the host and internal I/Os, all of rebuild/copy back in the queue 72 are requested to the lower layer. And the number of normal I/O processings of the counter 69 is initialized to a predetermined I/O ratio (e.g. 45), and processing ends.

Now rebuild/copy back request processing 74 will be described with reference to FIG. 13.

(S70) When the DTC receives the I/O request of rebuild/copy back from the system control module 38 (see FIG. 1), it is judged whether the number of requests in-process is "0" for both the host and internal I/Os referring to the in-process counters 67 and 68. If the number of requests in-process is "0" for both the host and internal I/Os then processing advances to step S74.

(S72) If the number of requests in-process is not "0" for at least one of the host and internal I/Os, it is judged whether the number of normal I/O processings of the counter 69 is "0". If the number of normal I/O processings is not "0", the received rebuild/copy back I/O request is en-queued in the queue 72 of rebuild/copy back, and processing ends.

(S74) If the number of requests in-process is "0" for both the host and internal I/Os, or if the number of normal I/O processings is "0", then the requested rebuild/copy back is requested to the lower layer. And the number of normal I/O processings of the counter 69 is initialized to a predetermined I/O ratio (e.g. 45), and processing ends.

In this way, the DTC 60 manages the load of the host I/Os (host read) and internal I/Os (pre-fetch, write back) individually, so, as FIG. 14 shows, the number of processing requests to be issued to the virtual disk (RLU) 2 can be-restricted individually. Therefore the balance of the host I/Os and the internal I/Os can be controlled with assigning priority to the host I/Os.

Specifically, the highest priority is assigned to the host I/Os, so the host I/Os are processed with priority in the virtual disk 2, and the host I/Os are issued to the virtual disk 2 while the number of I/Os in-process is restricted. When there are no more host I/Os held in the queue 63, the internal I/Os are issued to the virtual disk 2 from the internal I/O queue 64 while the number of I/Os in-process is restricted.

If a host I/O arrives during this time, the host I/O is issued to the virtual disk 2. The host I/Os is waited for the number of internal I/Os in-process at maximum, and the internal I/Os can be executed while preventing a time out of the host I/Os. The disk device 2 has a queue for a maximum of 16 commands, for example, and reorders the commands so that continuous processing can be performed. Therefore a conventional I/O request issue control; especially considering continuous processing, is unnecessary If host I/Os are processed with priority by reordering, the wait time of a host I/O can be further decreased. Also the number of host I/Os in-process is restricted, so issuing excessive host I/Os beyond the processing capability can be suppressed, and the capability of the disk device can be presented at the maximum level.

Also the queue can be searched depending on the I/O type, so the overhead of the DTC can be decreased, and in both the in-process queue and the waiting queue, requests are stored in the sequence of priority, so the priority judgment of subsequent I/O requests becomes easy, and high-speed load balance control becomes possible.

A dedicated load control mechanism is disposed for rebuild/copy back, and when the number of host/internal I/Os in-process is "0", the I/O request of rebuild/copy back is issued to the lower layer, and each time the number of normal I/O processings reaches the I/O ratio, the I/O processing of rebuild/copy back is issued.

Therefore the load adjustment between normal I/Os and rebuild/copy back becomes possible, and the completion time of rebuild/copy back can be guaranteed while maintaining a certain degree of response of the host I/Os.

This I/O ratio can be adjustable, and if the I/O ratio is high (e.g. 45), then greater importance is attached to the host performance, and if the I/O ratio-is low (e.g. 15), then greater importance is attached to the rebuild completion time.

[Cache Back Schedule Processing Based on Dynamic Traffic Processing Control]

Cache back scheduling control for executing internal I/Os efficiently in the above mentioned dynamic traffic control for managing the number of processings for host I/Os and internal I/Os individually will now be described.

Figure 17:
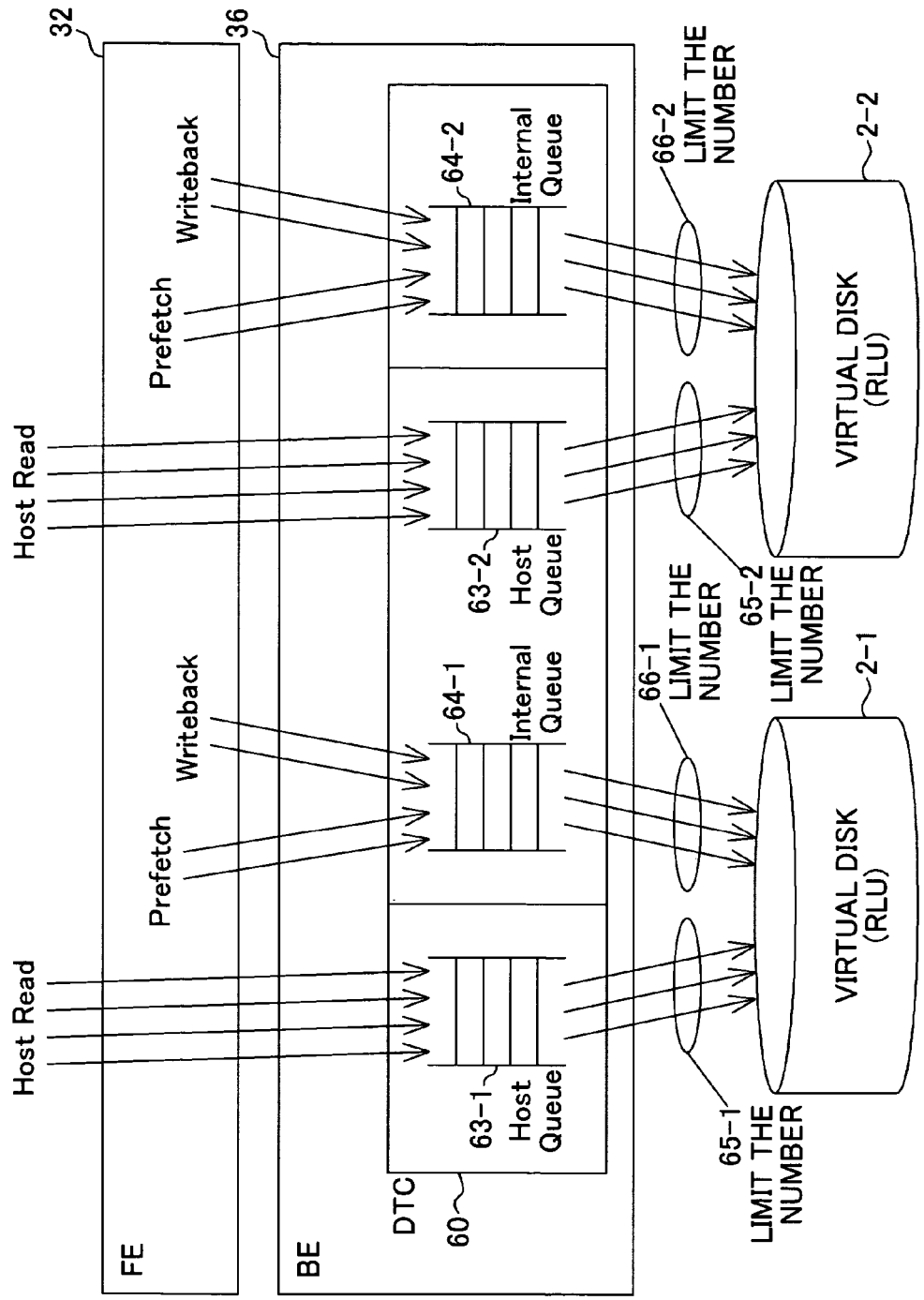
FIG. 17 is a block diagram depicting the system according to the third embodiment of the present invention.
Figure 18:
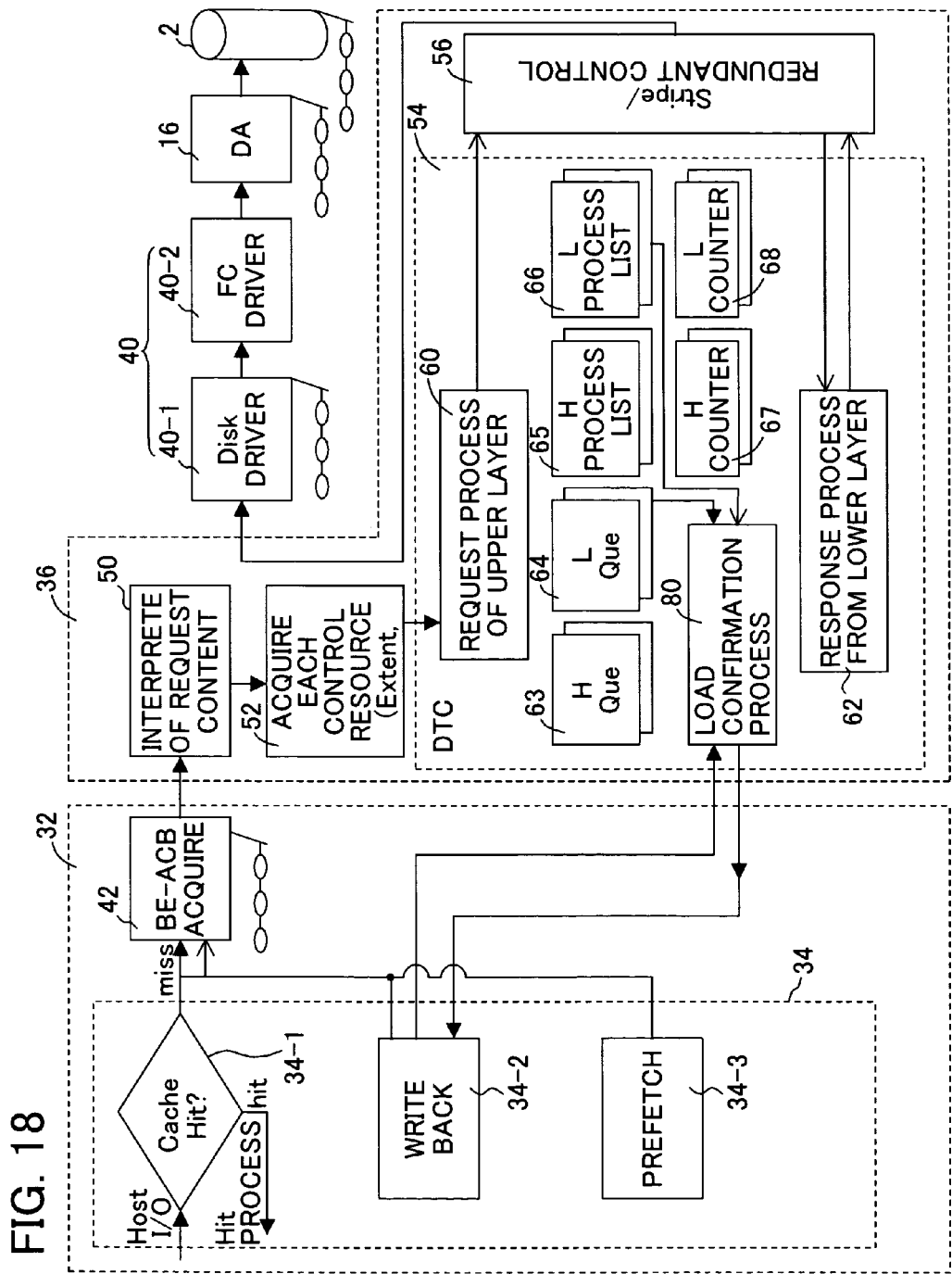
FIG. 18 is a functional block diagram depicting the third embodiment of DTC in FIG. 17.
Figure 19:
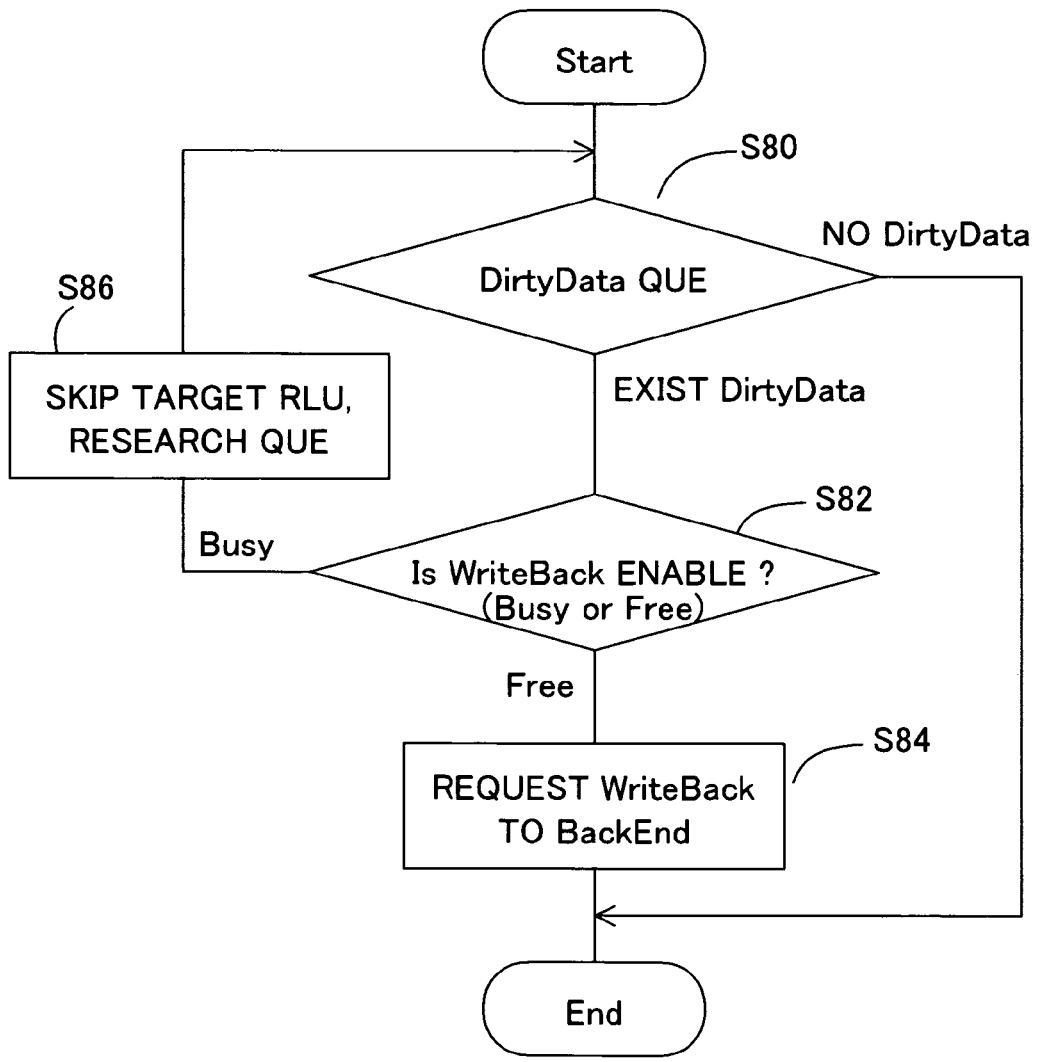
FIG. 19 is a flow chart depicting the write back request processing in FIG. 18.
Figure 20:
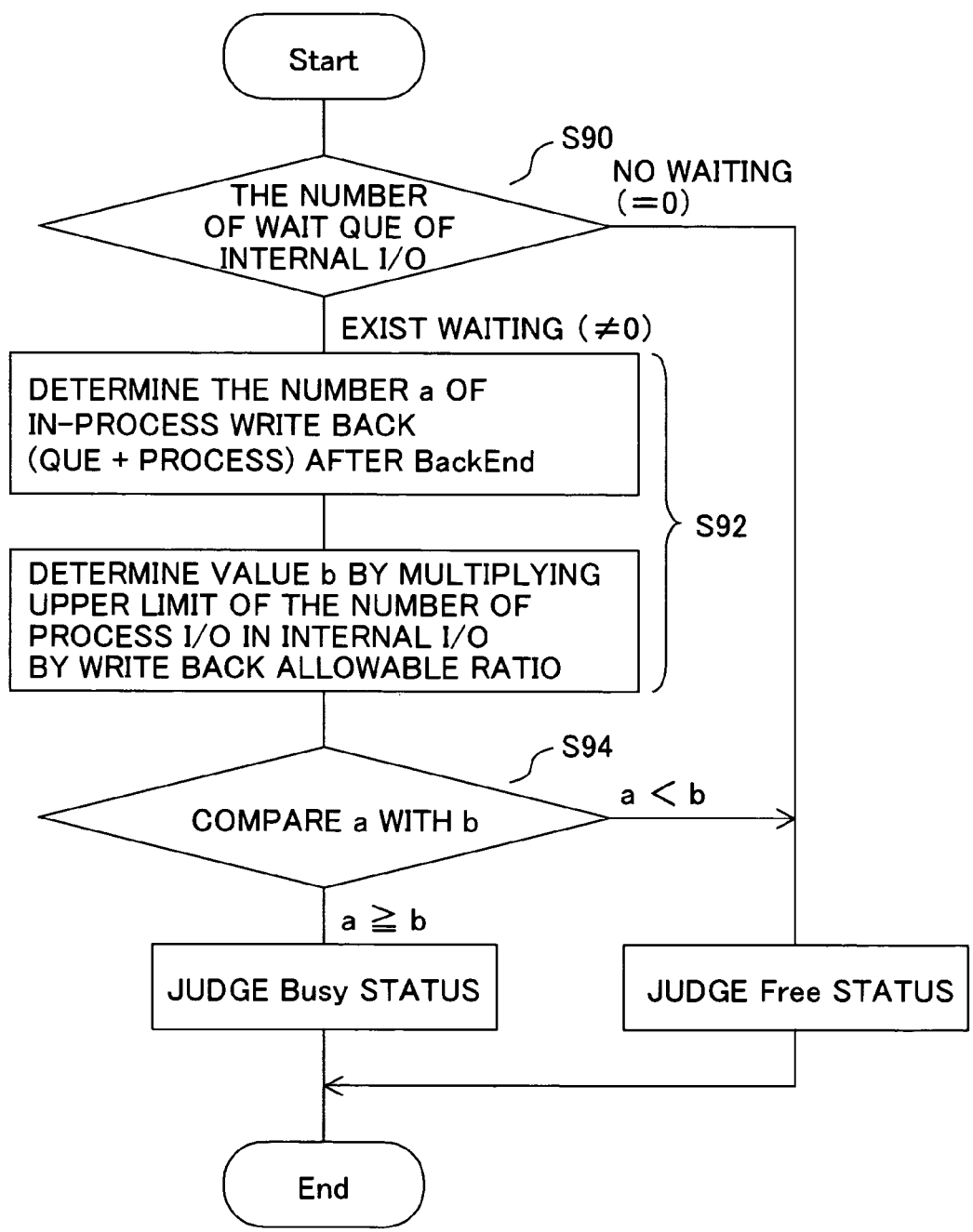
FIG. 20 is a flow chart depicting the load confirmation processing in FIG. 18.
Figure 21:
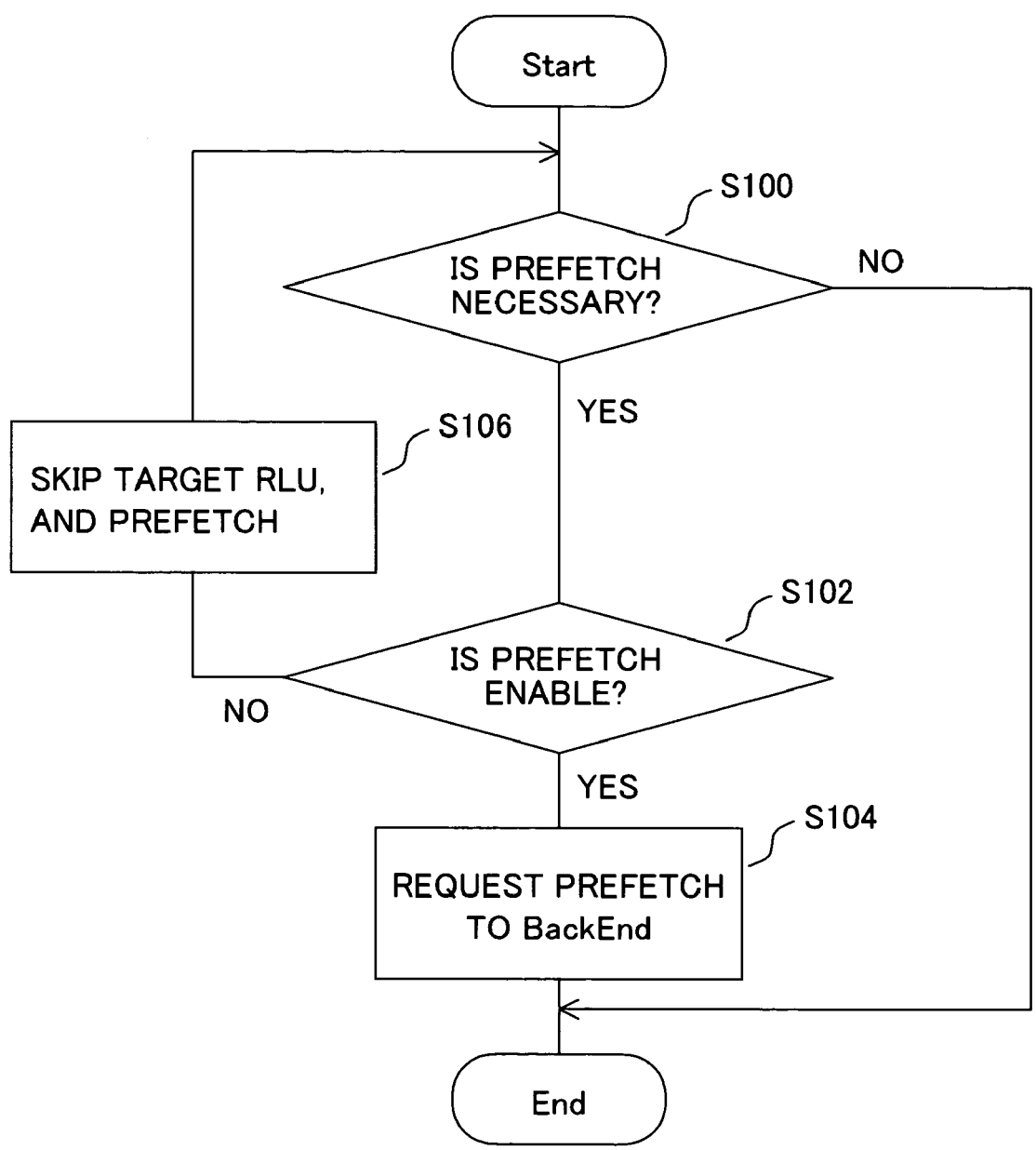
FIG. 21 is a flow chart depicting the pre-fetch request processing in FIG. 18.
Figure 22:
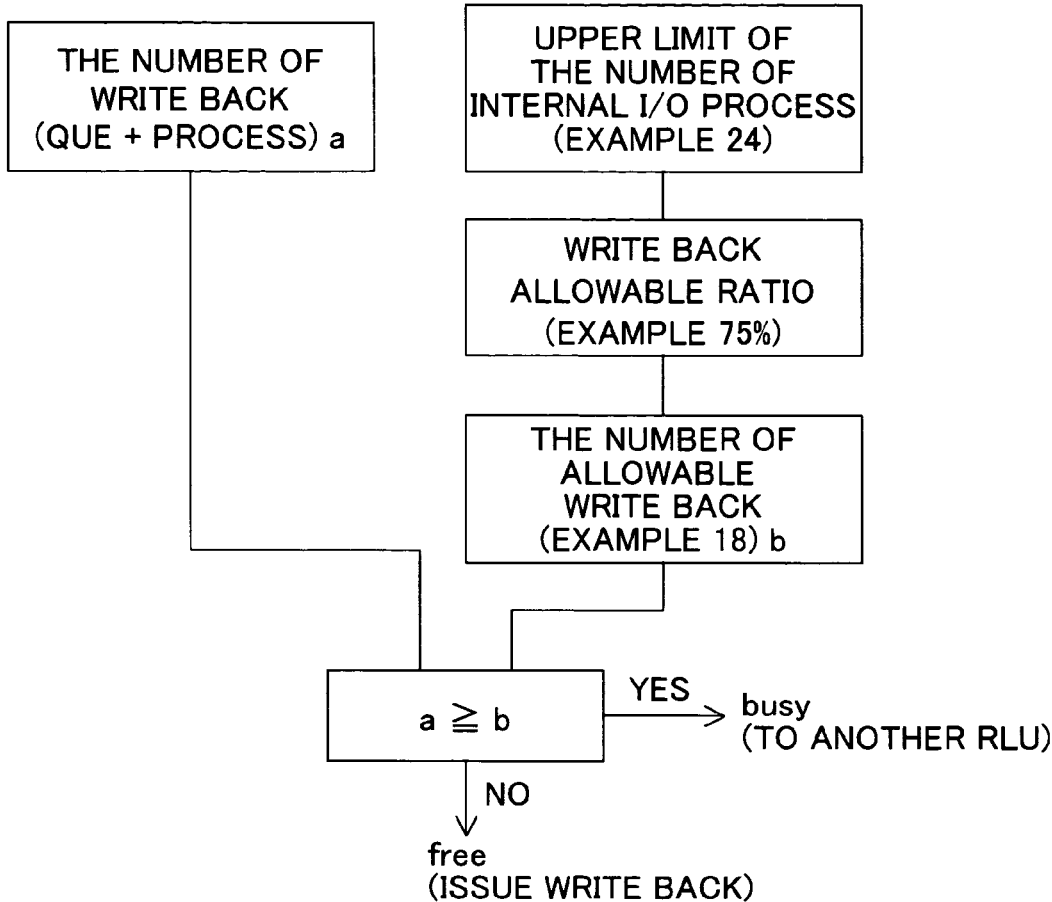
FIG. 22 is a diagram depicting the operation of the write back judgment processing in FIG. 18.
Figure 23:
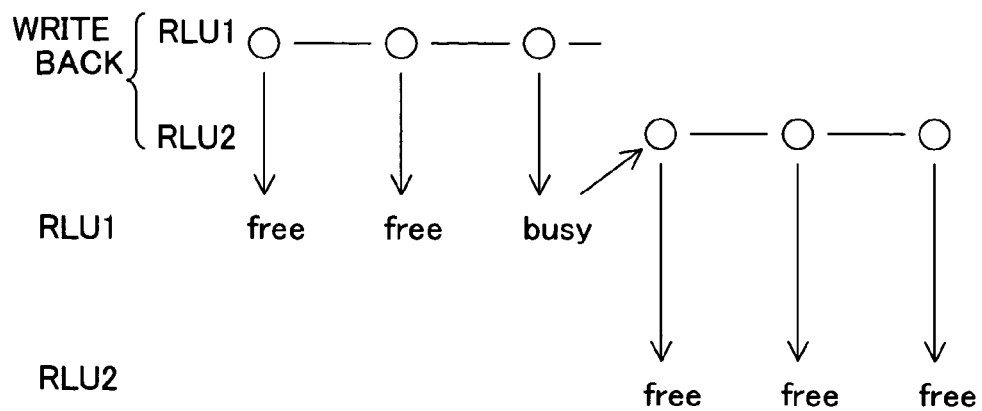
FIG. 23 is a diagram depicting the write back processing operation in FIG. 18.
Figure 24:
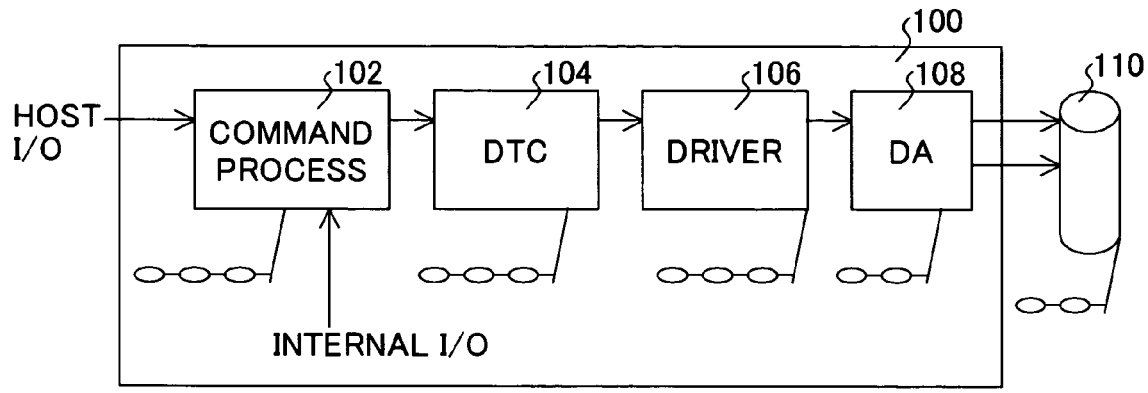
FIG. 24 is a block diagram depicting a prior art.
Figure 25:
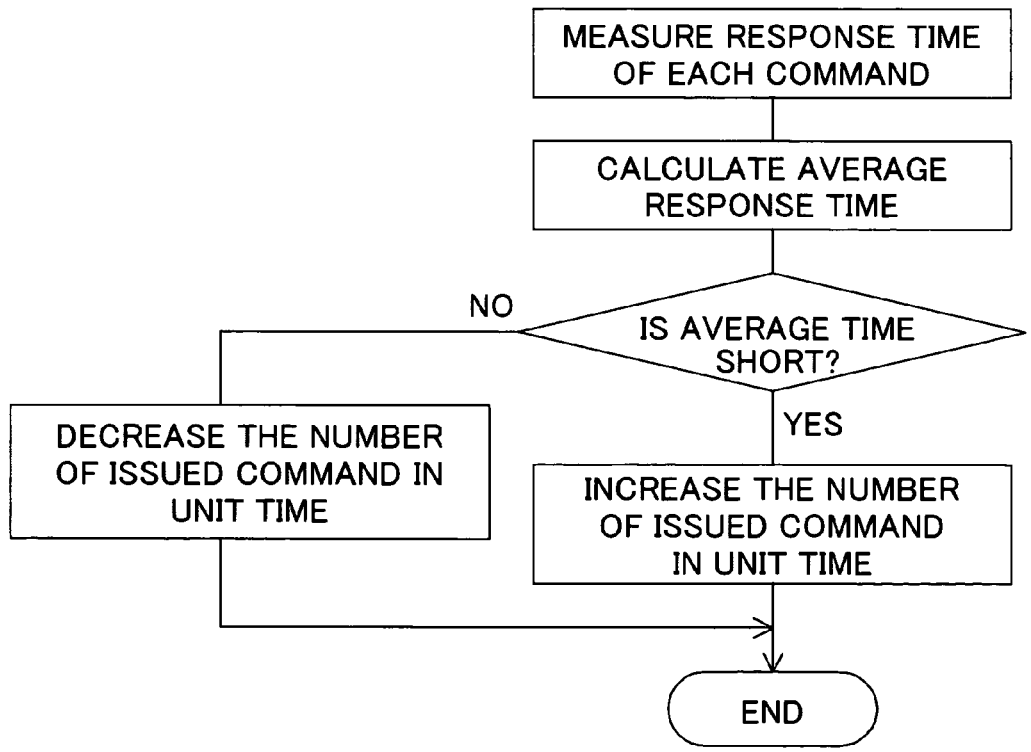
FIG. 25 is a flow chart depicting the DTC processing according to the prior art.

FIG. 17 is a system block-diagram depicting the dynamic traffic management control according to the third embodiment of the present invention, FIG. 18 is a functional block diagram depicting the dynamic traffic control mechanism according to the third embodiment of the present invention, FIG. 19 is a flow chart depicting the processing of the write back module in FIG. 18, FIG. 20 is a flow chart depicting the processing of the load confirmation processing module in FIG. 18, FIG. 21 is a flow chart depicting the processing of the pre-fetch module in FIG. 18, and FIG. 22 and FIG. 23 are diagrams depicting the operation of the configuration in FIG. 18.

It was described that the above mentioned dynamic traffic control in FIG. 2 to FIG. 8 is performed in RLU units. As FIG. 17 shows, when one controller 1 (see FIG. 1) charges two virtual disks (RLU) 2-1 and 2-2, the DTC 60 manages the load in each RLU 2-1 and 2-2 individually for the host I/Os (host read) and internal I/Os (pre-fetch, write back). In other words, the number of processing requests to be issued to the virtual disks (RLU) 2-1 and 2-2 is individually restricted.

Specifically, the highest priority is assigned to the host I/Os, so the host I/Os are processed with priority in the virtual disks 2-1 and 2-2, and the host I/Os are issued to the virtual disks 2-1 and 2-2 while the number of I/Os in-process is restricted. When there are no more host I/Os held in the queues 63-1 and 63-2, internal I/Os are issued to the virtual disks 2-1 and 2-2 from the internal-I/O queues 64-1 and 64-2 respectively, while the number of I/Os in-process is restricted.

If the host I/O arrives during this time, the host I/O is issued to the virtual disks 2-1 and 2-2. The host I/O is waited for the number of internal I/Os in-process at maximum, and the internal I/Os can be executed while preventing a time out of the host I/Os.

In the configuration for performing this load control, write back processing, which is an internal I/O, is executed according to a predetermined schedule when the host I/Os are not sent for a predetermined time, and are normally executed targeting the area of the cache memory 18 (see FIG. 1) where necessity of use is low (e.g. area used at most distant past).

In this case, for the actual cache area, the range of LBA (Logical Block Address) on the virtual disk (RLU) is allocated for operation. By returning the dirty data (e.g. data used at most distant past with low necessity) to the disk by write back, the allocation of the cache area can be released and the cache area can be allocated to the range of LBA on another virtual disk (RLU).

In the above mentioned method for individually managing internal I/Os and host I/Os, write back processing for efficiently releasing the cache area is preferable when the cache area is allocated to a plurality of virtual disks.

FIG. 18 is a functional block diagram depicting the front end and the back end modules for performing such efficient write back-control, where identical composing elements as FIG. 2 are denoted by identical symbols.

In other words, the cache control module 34 of the front end module 32 is comprised of a module 34-1 for judging whether the read request of the host is a miss hit (target data does not exist on the cache memory 18) or not, a module 34-3 for requesting a pre-fetch due to the read request in the internal schedule, and a write back module 34-2 for returning data written in the cache memory by a write request and such dirty data as the oldest data from the cache memory to the disk.

By the request of this module, the front end module 32 enables activation to the back end, and in the BE (Back End) —ACB (Access Control Block) acquisition processing 42, BE—ACB (see FIG. 3) is acquired for the I/O command of which activation is enabled to the back end, and access to the back end module 36 is enabled.

Interpretation processing 50 is performed in the back end module 36 for the request content of the I/O command, and according to this interpretation (e.g. I/O type on whether the command is a host read or not), the acquisition processing 52 for each resource for control is executed. In the resource acquisition processing 52, an internal buffer area (Extent) is acquired, and an exclusive right is set.

After acquiring this resource, load control is performed in RLU units in DTC-(Dynamic Traffic Control) processing 54. As shown in FIG. 17, the DTC processing 54 is comprised of a queue-63 of host I/Os, a queue 64 of internal I/Os, an in-process list 65 of host I/Os, a host I/O counter 67 for counting the number of, I/Os in-process of the list 65, an in-process list 66 of internal I/Os and an internal I/O counter 68 for counting the number of I/Os in-process of the list 66.

The queues 63 and 64 are queues for waiting and holding I/O requests in the disk device (in RLU unit), and the in-process lists 65 and 66 are lists of I/O requests which were issued to the disk device (in RLU units) and for which processing has not completed, and counters 67 and 68 indicate the number of I/O requests which were issued to the disk device (in RLU units) and for which processing has not completed. The host I/Os and the internal I/Os have separately these elements, and the respective number of I/Os issued are individually managed.

As described in FIG. 6, in the request processing 60 from the higher layer, issue of I/O requests to the lower layer is controlled referring to the priority-and the in-process counters 67 and 68 depending on whether the I/O request from the higher layer is a host I/O or an internal I/O. In the request processing 62 of the lower layer, issue of the I/O request to the lower layer is controlled referring to the queues 63 and 64 depending on whether the completion response from the lower layer is a host I/O or an internal I/O, as described in FIG. 7.

The back end module 36 further comprises a stripe/redundancy control module 56, and this-module 56 divides the I/O requests in RLU units into commands in disk units, and issues the disk command to the disk driver 40-1/FC (Fiber Channel) driver 40-2. The disk command is sent from the driver 40 to the DA 16, and the disk command is then transferred to the magnetic disk device 2 (20-2P) via the FC_AL 4. By this, the magnetic disk device 2 (20-2P) executes this disk command.

This DA 16 issues a tag (Head of Queue or Simple Queue) specified by the DTC 54 when a disk command is issued to the magnetic disk device 2. Head of Queue means that the command is en-queued without becoming a reordering target on the disk, and Simple Queue means that this command becomes a reordering target on the disk.

To perform write back processing efficiently, a processing module 80, for checking the load status of the internal I/Os for a virtual disk (RLU) and judging the free status or busy status is disposed. This processing will be called the "load confirmation processing" herein below In the write back module 34-2 of the cache control 34, a function for calling up the load confirmation processing 80 before requesting a write back to the back end module 36 and requesting a write back to the back end module 36 if free, or holding the write back request to the target virtual disk (RLU) if busy and searching if the cache data (dirty data) to be written back to another virtual disk (RLU) remains, is added.

Specifically, the load confirmation processing will be described with reference to FIG. 19 to FIG. 23. FIG. 19 is a flow chart depicting the write back schedule processing of the cache control 34.

(S80) When the write back module 34-2 is started up according to the internal schedule, it is judged for the data in the cache memory (area) 18 whether there is dirty data (data to be written back, such as old data) from the data queue. If there is no dirty data in the cache memory (area), processing ends.

(S82) If there is dirty data on a virtual disk (RLU), the data load confirmation processing 80 is called up for the RLU. And as described in FIG. 20, the load status of the internal I/O is checked for the RLU, and processing for judging whether the status is free or busy is executed.

(S84) If free status is judged, a write back is requested to the back end module 36, and processing ends.

(S86) If the status is busy, a write back to the target virtual disk (RLU) is held, and it is searched whether cache data (dirty data) to be written back to another virtual disk (RLU) remains. And processing returns to step S80.

Now the load confirmation processing 80 will be described with reference to FIG. 20. (S90) For the target virtual disk (RLU), the number of internal I/Os in the queue 64 of the DTC 54 is confirmed, and if there are none in the queue (=0), it is judged as free status.

(S92) If there is an I/O held in the queue 64 of the internal I/Os of the RLU (number of I/Os in the queue is not "0"), then the following conditions are judged. The number of write back requests in-process "a" (that is, the number of write back requests in the queue 64 of internal I/O+number of write back requests in-process in the in-process list 66 of the internal I/O) after back end is determined for the target virtual disk (RLU). Then the value "b" when the upper limit of the number of I/Os in-process of the internal I/O ("m" in FIG. 4) is multiplied by a certain ratio (hereafter called the "write back allowable ratio") is determined.

(S94) "a" and "b" in step S92 are compared, and the status is determined as busy if the number of write back requests in-process "a" is the same as or more than the write back allowable value "b", and is determined as free if not. The write back allowable ratio can be a value greater than 0% (Ok to-exceed 100%).

Operation of this processing will now be described. As described above, for a cache area, the range of LBA on the virtual disk (RLU) is allocated for operation, so by returning the dirty data to the disk by write back, allocation of the cache area can be released, and the cache area can be allocated to the range of LBA on another virtual disk (RLU).

Therefore it is more efficient to use the disk to perform write back assigning priority to the-virtual disk (RLU) which has a low internal I/O load rather than a virtual disk (RLU) which has a high internal I/O load, and therefore the cache area can be released sooner. As the load confirmation processing to implement this, condition judgment 1 in the above mentioned step S90 is performed concerning the number of requests held in the queue of the target virtual disk.

One condition to implement this function is to not let the processing request of the pre-fetch to the back end module 36 wait, since the pre-fetch request of the pre-fetch module 34-3 relates to the host read performance. The schedule of write back, on the other hand, is performed with each predetermined time interval, so write back is scheduled later, even if the write back is held by this function.

Only with the above mentioned condition in step S90, the load confirmation processing 80 judges the status as chronically busy if the number of pre-fetches is high, therefore write back requests can hardly be requested to the back end processing 36. In order to allow the request of a write back even if the number of pre-fetches is high, that is in order to prevent the above mentioned phenomena, the condition judgment 2 in steps S92 and S94 is performed as load confirmation processing.

The processing of the pre-fetch module will be described with reference to FIG. 21.

(S100) It is judged whether pre-fetch of the target virtual disk-(RLU) is necessary. If pre-fetch is not necessary, processing ends.

(S102) If pre-fetch of the target virtual disk (RLU) is necessary, it is judged whether requesting a pre-fetch of the RLU is possible by the judgment condition on the number of requests in-process described in FIG. 6.

(S104) If free status (pre-fetch possible) is judged, write back is requested to the back end module 36, and processing ends.

(S106) If busy status (pre-fetch impossible) is judged, pre-fetch of the target-virtual disk (RLU) is held, and it is judged whether pre-fetch is necessary for another virtual disk (RLU). And processing returns to step S100.

The above mentioned write back control will be described with reference to FIG. 22 and FIG. 23. As FIG. 22 shows, if the case when the upper limit of the number of internal I/Os in-process is "24" and a write back allowable ratio of 75% is assumed, then the allowable number of write back-requests in the judgment condition 2 is b="18".

In the condition judgment 1, if 24, which is the limit value of the I/O processing requests, of only write back requests are sent to the back end module 36 of a virtual disk (RLU), then all 24 I/Os become in-process after back end, and in this status, the load confirmation processing is judged as busy status, and busy status continues until one of the write back requests completes.

If 24, which is the limit value, of the I/O processing requests of pre-fetch only are sent to the back end module 36 of a virtual disk (RLU), all 24 I/Os become in-process after back end 36, and in this status, the load confirmation processing is judged as free status based on the judgment condition 2.

Even if pre-fetch is in-process after back end, the status is judged as free until the back end 36 accepts the write back requests of the remaining 18 I/Os (75% of the limit value 24). When the back end 36 accepts the 18 write back requests, the status becomes busy.

And when the write back requests are issued sequentially in free status in a virtual disk (RLU), and the status becomes busy, and processing moves to the write back of another virtual disk (RLU), as shown in FIG. 23. Therefore write back is executed assigning priority to a virtual disk (RLU) with less I/O requests, that is, where the load of the internal I/Os is low, rather than a virtual disk (RLU) with more I/O requests in a queue, that is, where the load of the internal I/Os is high, so that the efficiency of using the disk is improved, and the cache area can be released sooner.

Since the number of processing write back requests, which are internal I/Os, in the back end is allowed based on the upper limit of the number of internal I/Os in-process considering the restriction of the number of internal I/Os to be issued, even if many pre-fetch requests are sent, the status where the issue of write back is held can be prevented, the cache area can be released sooner, and an area for data write and pre-fetch of the host can be secured more easily.

OTHER EMBODIMENTS

In the above mentioned embodiments, the present invention was described using a RAID with the redundancy configuration in FIG. 1, but the present invention can be applied to the storage system with another redundancy configuration. For the physical disks, a magnetic disk, optical disk, magneto-optical disk, and various storage devices can be applied.

Also as an internal I/O, one point copy, which sequentially copies data in the background of the host I/Os, can be applied.

In the embodiment of FIG. 18, the issuing of requests of pre-fetch 34-3 may be controlled using the load confirmation processing 80, just like write back.

The present invention was described using the embodiments, but the present invention can be modified in various ways within the scope of the essential character of the present invention, which shall not be excluded from the cope of the present invention.

As described above, according to the present invention, the load of the host I/Os (host read) and internal I/Os (pre-fetch, write back) are individually managed, so the number of processing requests to be issued to the virtual disk (RLU) 2 can be individually restricted, and the load balance between the host I/Os and the internal I/Os can be controlled by assigning priority to the host I/Os.

For rebuild/copy back, a dedicated load control mechanism is disposed, and the load adjustment between normal I/Os and rebuild/copy back is performed, so the completion time of rebuild/copy back can be guaranteed while maintaining a certain degree of response of the host I/Os.

What is claimed is:

1. A storage system for accessing a connected disk device according to an I/O request requested from a host and an I/O request generated inside the storage system and executing the I/O requests, comprising:
   a storage controller comprising:
   a command processing section for executing command processing according to said I/O request requested from said host or said I/O request generated inside said storage system; and
   an access execution section for issuing an access request to said disk device according to a processing result,
   wherein said access execution section restricts the number of requests in-process which were issued to said disk device and for which said disk device has not completed the access processing for a number of access requests by a host I/O request from said host, and a number of access requests by an internal I/O request generated inside the storage controller itself, individually.

2. The storage system according to claim 1, wherein said access execution section comprises:
   a first counter for counting the number of access requests in-process by said host I/O request; and
   a second counter for counting the number of access requests in-process by said internal I/O request,
   and wherein said access execution section judges whether said I/O request is an access request by said host I/O request or an access request by said internal I/O request, and restricts said number of requests in-process individually referring to said first or second counter according to a result of said judgment.

3. The storage system according to claim 2, wherein said access execution section increments said first or second counter when said access execution section issues an access request to said disk device, and decrements said first or second counter when said access execution section receives a response to said access request from said disk device.

4. The storage system according to claim 1, wherein said access execution section comprises:
   a first queue for queuing the access requests by said host I/O request, which exceed a limit value of the number of access requests in-process by said host I/O request; and
   a second queue for queuing the access requests by said internal I/O request, which exceed a limit value of the number of access requests in-process by said internal I/O request.

5. The storage system according to claim 1, wherein said access execution section comprises:
   a first list of the access requests in-process by said host I/O request; and a second list of the access requests in-process by said internal I/O request, and wherein when said access execution section receives access requests, said access execution section judges priority of said access requests, referring to said first or second list, and issues said access request with high priority to said disk device.

6. The storage system according to claim 5, wherein said access execution section stores said access requests in said first list and said second list in the sequence of the priority.

7. The storage system according to claim 1, wherein said access execution section issues said access requests in Raid Logical Unit (RLU) units that logically indicate said disk devices.

8. A storage system for accessing a connecting disk device according to an I/O request requested from a host and an I/O request generated inside the storage system and executing the I/O requests, comprising:
a command processing section for executing command processing according to said I/O request requested from said host or said I/O request generated inside said storage system; and
an access execution section for issuing an access request to said disk device according to a processing result,
wherein said access execution section restricts the number of requests in-process which were issued to said disk device and for which said disk device has not completed the access processing for a number of access requests by a host I/O request from said host, and a number of access requests by an internal I/O request generated inside the storage system, individually,
and wherein said access execution section issues at least one access request of rebuild and copy back each time when said access execution section issues a predetermined number of access requests.

9. The storage system according to claim 8, wherein said access execution section issues at least one access request of said rebuild and copy back when said number of requests in-process is zero for both said host I/O request and said internal I/O request.

10. The storage system according to claim 8, wherein said access execution section holds at least one access request of said rebuild and copy back in a queue when a predetermined number of said access requests are not issued.

11. A storage system for accessing a connecting disk device according to an I/O request requested from a host and an I/O request generated inside the storage system and executing the I/O requests, comprising:
a command processing section for executing command processing according to said I/O request requested from said host or said I/O request generated inside said storage system; and
an access execution section for issuing an access request to said disk device according to a processing result,
wherein said access execution section restricts the number of requests in-process which were issued to said disk device and for which said disk device has not completed the access processing for a number of access requests by a host I/O request from said host, and a number of access requests by an internal I/O request generated inside the storage system, individually,
and wherein said command processing section performs write back request processing, which is said internal I/O request, according to a predetermined schedule,
and said write back request processing receives the load status in RLU units, to logically indicate said disk devices, from said access execution section, and issues a write back request prioritizing an RLU with lesser load of said internal I/O requests.

12. The storage system according to claim 11, wherein said access execution section judges that a load of said RLU is relatively light when the number of internal I/Os in a queue for the target RLU is small, and enables to issue the write back request for said target RLU in said write back request processing.

13. The storage system according to claim 11, wherein said access execution section judges the load status of said RLU from a comparison result between a number of write back requests in said access execution section and a write back allowable value based on an upper limit of the number of said internal I/Os in-process, when a number of internal I/Os in a queue for the target RLU is high.

14. A disk load balance control method of a storage controller for accessing a connected disk device according to an I/O request requested from a host and an I/O request generated inside a storage controller and executing the I/O requests, comprising the steps of:
issuing an access request to said disk device according to said I/O requested from said host or said I/O request generated inside said storage system; and
restricting a number of access requests in-process which were issued to said disk device and for which said disk device has not completed access processing for a number of access requests by a host I/O request from said host, and a number of access requests by an internal I/O request generated inside the storage controller itself, individually.

15. The disk load balance control method according to claim 14, wherein said restriction step comprises a step of restricting said access requests in-process individually by referring to a first counter for counting the number of access requests in-process by said host I/O request and a second counter for counting the number of access requests in-process by said internal I/O request, according to a result of said judgment on whether said I/O request is an access request by said host I/O or an access request by said internal I/O request.

16. The disk load balance control method according to claim 15, further comprising:
a step of incrementing said first or second counter when said one of said number of access requests by said host I/O request or said internal I/O request are issued to said disk device; and
a step of decrementing said first or second counter when a response to said access request by said host I/O request or said internal I/O request is received from said disk device.

17. The disk load balance control method according to claim 14, further comprising:
a first queue step of queuing in a first queue the access requests by said host I/O request, which exceed a limit value of the number of access requests in-process by said host I/O request; and
a second queue step of queuing in a second queue the access requests by said internal I/O request, which exceed a limit value of the number of access requests in-process by said internal I/O request.

18. The disk load balance control method according to claim 14, wherein said access request issuing step further comprises a step of judging the priority of said access requests, referring to a first list of the access requests in-process by said host I/O request, and a second list of the access requests in-process by said internal I/O request, when said access requests are received, and issuing said access request with a higher priority to said disk device.

19. The disk load balance control method according to claim 18, wherein said access requests are stored in said first list and said second list in a sequence based on priority.

20. The disk load balance control method according to claim 14, wherein said issuing step comprises a step of issuing said access requests in RLU units which logically indicate said disk devices.

21. A disk load balance control method for accessing a connecting disk device according to an I/O request requested from a host and an I/O request generated inside the storage system and executing the I/O requests, comprising the steps of:
   issuing an access request to said disk device according to said I/O request requested from said host or said I/O request generated inside said storage system;
   restricting a number of access requests in-process which were issued to said disk device and for which said disk device has requests by a host I/O request from said host, and a number of access requests by an internal I/O request generated inside the storage system, individually; and
   issuing at least one access request of rebuild and copy back each time a predetermined number of access requests are issued.

22. The disk load balance control method according to claim 21, further comprising a step of issuing at least one access request of said rebuild and copy back when said number of access requests in-process is zero for both said host I/O request and internal I/O request.

23. The disk load balance control method according to claim 21, further comprising a step of holding at least one access request of said rebuild and copy back in a queue when a predetermined number of access requests are not issued.

24. A disk load balance control method for accessing a connecting disk device according to an I/O request requested from a host and an I/O request generated inside the storage system and executing the I/O requests, comprising the steps of:
   issuing an access request to said disk device according to said I/O request requested from said host or said I/O request generated inside said storage system;
   restricting a number of access requests in-process which were issued to said disk device and for which said disk device has not completed access processing for a number of access requests by a host I/O request from said host, and a number of access requests by an internal I/O request generated inside the storage system, individually,
   wherein said access request issuing step comprises a step of executing write back request issuing processing, which is said internal I/O request, according to a predetermined schedule, judging a load status in RLU units which logically indicate disk devices, and issuing a write back request, which prioritizes an RLU with lesser load of said internal I/O requests.

25. The disk load balance control method according to claim 24, wherein said write back request issuing step comprises a step of judging that a load is relatively light when the number of internal I/Os in a queue for a target RLU is small, and enabling issuance of the write back request to said target RLU.

26. The disk load balance control method according to claim 24, wherein said write back request issuing step comprises a step of judging the load status of said RLU from the comparison result between a number of write back requests and a write back allowable value based on the upper limit of the number of said internal I/Os in-process, when the number of internal I/Os in a queue for the target RLU is high.

* * * * *